(12) United States Patent
Nader et al.

(10) Patent No.: US 10,812,240 B2
(45) Date of Patent: Oct. 20, 2020

(54) DETERMINATION OF FREQUENCY RESOURCES FOR WIRELESS COMMUNICATION DEVICES

(71) Applicant: Telefonaktiebolaget LM Ericsson (publ), Stockholm (SE)

(72) Inventors: Ali Nader, Malmö (SE); Andreas Höglund, Solna (SE); Yuhang Liu, Lund (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 16/089,689

(22) PCT Filed: Mar. 30, 2017

(86) PCT No.: PCT/EP2017/057557
§ 371 (c)(1),
(2) Date: Sep. 28, 2018

(87) PCT Pub. No.: WO2017/167885
PCT Pub. Date: Oct. 5, 2017

(65) Prior Publication Data
US 2019/0319764 A1  Oct. 17, 2019

Related U.S. Application Data

(60) Provisional application No. 62/317,381, filed on Apr. 1, 2016.

(51) Int. Cl.
*H04L 5/00* (2006.01)
*H04W 24/08* (2009.01)
*H04W 72/04* (2009.01)

(52) U.S. Cl.
CPC ........... *H04L 5/0053* (2013.01); *H04W 24/08* (2013.01); *H04W 72/0453* (2013.01)

(58) Field of Classification Search
CPC ............... H04L 5/0053; H04L 5/0091; H04W 72/0453; H04W 24/08
See application file for complete search history.

(56) References Cited

U.S. PATENT DOCUMENTS 9,681,482 B2 * 6/2017 Yang ...................... H04W 76/15
10,021,712 B2 * 7/2018 Patel ..................... H04B 7/0413
2013/0083749 A1  4/2013 Xu et al.

FOREIGN PATENT DOCUMENTS

EP  3411985 A1  12/2018

OTHER PUBLICATIONS

U.S. Appl. No. 62/292,073 (Year: 2016).*
(Continued)

*Primary Examiner* — Ian N Moore
*Assistant Examiner* — Rushil Parimal Sampat
(74) *Attorney, Agent, or Firm* — Sage Patent Group

(57) ABSTRACT

Systems and methods of determining a frequency resource for a wireless device to operate in a wireless communication system. In one exemplary embodiment, a method performed by a wireless device in a first wireless communication system for determining a frequency resource on which to operate comprises determining whether a parameter is received via dedicated control signaling in the first wireless communication system. Further, a value of the parameter indicates one or more frequency resources in which the first wireless communication system operates. In response to determining that the parameter is received via the dedicated control signaling in the first wireless communication system, the method includes configuring the wireless device to operate on a frequency resource whose location is defined (Continued)

based on the parameter received via such dedicated control signaling.

16 Claims, 20 Drawing Sheets

(56) References Cited

OTHER PUBLICATIONS

Huawei, et al., "NB-IOT—downlink physical layer concept description", 3GPP TSG RAN WG1 Meeting #83, Anaheim, USA, Nov. 15, 2015, p. 1-11, R1-156462, 3GPP.

Lenovo, Discussion on NB0IoT multi-carrier operation, 3GPP TSG RAN WG1 Meeting #84, St. Julian's, Malta, Feb. 15, 2016, pp. 1-4, R1-161008, 3GPP.

Ericsson, UE Reconfiguration to a Non-Anchor Carrier, 3GPP TSG-RAN WG2 #93bis, Dubrovnik, Croatia, Apr. 11, 2016, pp. 1-7, Tdoc R2-162769, 3GPP.

NTT Docomo, Inc., "Way forward on RAN2 aspects of multiple PRB operations", TSG-RAN WG2 meeting #93,St. Julian's, Malta, Feb. 15, 2016, pp. 1-5, R2-161888, 3GPP.

Huawei (Rapporteur), "36331 running CR to capture agreements on NB-IoT_v1", 3GPP TSG-RAN WG2#93 Meeting, San Julian's, Malta, Feb. 15, 2016, pp. 1-66, R2-162070, 3GPP.

Huawei et al.,"On channel arrangement for NB-IOT", 3GPP RAN WG4 Meeting #77, Anaheim, US, Nov. 16, 2015, pp. 1-4, R4-157639, 3GPP.

Ericsson, "NB-IoT—Remaining issues for NPBCH and MIB", 3GPP TSG RAN WG1 NB-IoT Ad-Hoc Meeting, Sophia Antipolis, France, Mar. 22, 2016, pp. 1-6, pp. 1-6, R1-161820, 3GPP.

Ericsson et al., "WF on PRB indexing in MIB for NB-IoT in-band operation", 3GPP TSG RAN WG1 NB-IoT Ad-Hoc Meeting, Sophia Antipolis, France, Mar. 22, 2016, pp. 1-3, R1-162021, 3GPP.

European Office Action dated Jun. 8, 2020 for EP Application No. 17715432.5, 5 pages.

\* cited by examiner

| LTE SYSTEM BANDWIDTH | 3 MHZ | 5 MHZ | 10 MHZ | 15 MHZ | 20 MHZ |
|---|---|---|---|---|---|
| PRB INDICES FOR NB-PSS/SSS TRANSMISSION | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

1200

1201
BY A NETWORK NODE IN A FIRST WIRELESS COMMUNICATION SYSTEM, GENERATE DEDICATED CONTROL SIGNALING FOR A WIRELESS DEVICE IN THE FIRST WIRELESS COMMUNICATION SYSTEM, WHEREIN THE DEDICATED CONTROL SIGNALING INCLUDES A PARAMETER, WITH THE PARAMETER BEING TRANSMITTED TO THE WIRELESS DEVICE VIA THE DEDICATED CONTROL SIGNALING TO INDICATE TO THE WIRELESS DEVICE TO CONFIGURE ITSELF TO OPERATE ON A FREQUENCY RESOURCE WHOSE LOCATION IS DEFINED BASED ON THE PARAMETER RECEIVED VIA THE DEDICATED CONTROL SIGNALING, EVEN IF SUCH WIRELESS DEVICE ALSO RECEIVES THE SAME PARAMETER VIA THE COMMON SIGNALING

1203
TRANSMIT THE DEDICATED CONTROL SIGNALING TO THE WIRELESS DEVICE IN THE FIRST WIRELESS COMMUNICATION SYSTEM.

1205
GENERATE COMMON SIGNALING FOR MULTIPLE WIRELESS DEVICES IN THE FIRST WIRELESS COMMUNICATION SYSTEM, WHEREIN THE COMMON SIGNALING INCLUDES THE SAME PARAMETER THAT INDICATES TO THE MULTIPLE WIRELESS DEVICES ONE OR MORE FREQUENCY RESOURCES IN WHICH THE FIRST WIRELESS COMMUNICATION SYSTEM OPERATES, WITH THE COMMON SIGNALING BEING TRANSMITTED TO THE MULTIPLE WIRELESS DEVICES IN THE FIRST WIRELESS COMMUNICATION SYSTEM

1207
TRANSMIT THE COMMON SIGNALING TO THE WIRELESS DEVICE IN THE FIRST WIRELESS COMMUNICATION SYSTEM.

FIG. 12

DETERMINATION OF FREQUENCY RESOURCES FOR WIRELESS COMMUNICATION DEVICES

FIELD OF DISCLOSURE

The present disclosure relates generally to the field of communications, and in particular to determining a frequency resource for a wireless device to operate in a wireless communication system.

BACKGROUND

Narrowband Internet of Things (NB-IoT) is a narrowband system being developed for cellular IoT by the 3rd Generation Partnership Project (3GPP). NB-IoT is based on existing Long-Term Evolution (LTE) systems and addresses optimized network architecture and improved indoor coverage for a massive number of devices having the characteristics of low throughput (e.g., 2 kbps), low delay sensitivity (e.g., 10 seconds), ultra-low device cost (e.g., less than 5 US dollars), and low device power consumption (e.g., battery life of 10 years). It is envisioned that each cell (e.g., 1 km$^2$) in this system will serve thousands (e.g., 50 thousand devices) devices such as sensors, meters, actuators, and the like. In order to make use of existing spectrum (e.g., GSM), a fairly narrow bandwidth (e.g., 180 kHz, one LTE physical resource block (PRB)) has been adopted for NB-IoT technology.

For frequency division duplex (FDD) mode of NB-IoT (i.e., the transmitter and the receiver operate at different carrier frequencies) only half-duplex mode needs to be supported in the user equipment (UE). In order to achieve improved coverage, data repetition is used both in the uplink (UL) and the downlink (DL). The lower complexity of the devices (e.g., only one transmission/receiver chain) means that some repetition might be needed in normal coverage. Further, to alleviate UE complexity, the working assumption is to have cross-subframe scheduling. That is, a transmission is first scheduled on an NB-IoT physical downlink control channel (NPDCCH) and then the first transmission of the actual data on an NB-IoT physical downlink shared channel (NPDSCH) is carried out after the final transmission of the NPDCCH. Similarly, for uplink data transmission, information about resources scheduled by the network (NW) and needed by the UE for uplink transmission is first conveyed on the NPDCCH and then the first transmission of the actual data by the UE on the narrowband physical uplink shared channel (NPUSCH) is carried out after the final transmission of the NPDCCH. In other words, for both cases described above, the UE does not simultaneously perform both a reception of the control channel and a reception or transmission of the data channel.

Furthermore, not all subframes are available for dedicated data communication in the downlink of an NB-IoT cell. The amount of available subframes in the downlink is dependent on the operation mode (i.e., stand-alone, in-band, and guard-band modes) used in NB-IoT, as illustrated by FIG. 1. For all operation modes, a UE needs to rate-match around the following non-available subframes (or portions of a subframe):
  NB-IoT primary synchronization channel (NPSS) and NB-IoT secondary synchronization channel (NSSS);
  NB-IoT broadcast channel (NPBCH) containing the master information block (MIB);
  NB-IoT system information block broadcast on NPDSCH (e.g.)
  downlink gaps when configured; and
  NB-IoT reference symbols (NRS).

In addition, for in-band operation mode, a UE needs to rate-match around the LTE reference symbols (e.g., cell specific reference signal (CRS), and positioning reference signal (PRS), and LTE multimedia broadcast single frequency network (MBSFN) subframes).

The NPSS is transmitted every radio frame in subframe number five. The NB-IoT radio frame length is the same as in LTE (i.e., 10 msec. and consists of 10 subframes). The NPBCH containing the MIB occupies subframe zero in every radio frame. The NSIB1 is broadcast in the fourth subframe of every other radio frame. Rate matching may be performed around the downlink gaps.

FIGS. 1A-B depicts possible NB-IoT carriers for an NB-IoT fully operational cell deployment for in-band and guard band operation modes. FIG. 1C provides a table of in-band physical resource blocks (PRBs) possible for an NB-IoT fully operational cell deployment. Also as a result of 3GPP requirements, an NB-IoT fully operational cell (e.g., an NB-IoT anchor carrier in 3GPP) may only be deployed on 100 kHz frequency raster with an offset of less than ±7.5 kHz and for the in-band case, do not overlap the middle six LTE PRBs (i.e., too few subframes available due to broadcast of LTE synchronization signals and broadcast of LTE MIB), as illustrated by FIGS. 1A-B. An NB-IoT fully operational cell is a cell that is on the raster that an NB-IoT UE will initially search for and provides all necessary information such as synchronization signals, reference symbols, and broadcast information and may be used for dedicated communication.

Due to the nature of NB-IoT with half-duplex communication, cross-subframe scheduling, low bandwidth, the available amount of subframes, the 100 kHz channel raster requirement for fully operational cell deployment, and the amount of UEs to be served, NB-IoT will benefit from utilizing more spectrum for efficient operation, especially if such spectrum is already available (e.g., an in-band operation mode during low traffic hours when LTE carrier is not fully used). Therefore, in recent 3GPP meetings, NB-IoT multi-carrier operation has been adopted where the UE operating in an NB-IoT anchor carrier is configured through higher layer signaling (e.g., Layer 3 RRC) to operate in an NB-IoT non-anchor carrier during connected mode operation, as illustrated by FIG. 2. The non-anchor carrier does not have the requirement to be deployed on the 100 kHz raster (i.e., any LTE in-band PRB may be used as a non-anchor carrier). At the end of connected mode operation, the UE autonomously returns back to the anchor carrier.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

According to one aspect, a method performed by a wireless device in a first wireless communication system for determining a frequency resource on which to operate includes determining whether a parameter is received via dedicated control signaling in the first wireless communication system. Further, a value of the parameter indicates one or more frequency resources in which the first wireless communication system operates. In response to determining that the parameter is received via the dedicated control signaling in the first wireless communication system, the method includes configuring the wireless device to operate on a frequency resource whose location is defined based on the parameter received via such dedicated control signaling, even if the wireless device also receives the same parameter via common signaling that is transmitted to multiple wireless devices in the first wireless communication system.

According to another aspect, the parameter may indicate that one or more frequency resources within a guard-band or in-band of a second wireless communication system are the one or more frequency resources in which the first communication system is operable.

According to another aspect, the parameter may indicate the one or more frequency resources in which the first communication system is operable relative to one or more frequency resources of a second wireless communication system.

According to another aspect, the parameter may indicate that one or more frequency resources outside both a guard-band and in-band of a second wireless communication system are the one or more frequency resources in which the first communication system is operable.

According to another aspect, the first wireless communication system may be operable in a guard-band or in-band of a second wireless communication system.

According to another aspect, the first wireless communication system may be operable outside both a guard-band and in-band of a second wireless communication system.

According to another aspect, the method may include configuring the wireless device to operate on a frequency resource whose location is indicated by the parameter via the common signaling in the first wireless communication system responsive to determining that the parameter is not received via the dedicated control signaling.

According to another aspect, the method may include receiving, by the wireless device, a signal on a frequency resource on which the first wireless communication system operates, wherein the signal includes the dedicated control signaling having control information. Further, the method may include obtaining the dedicated control signaling from the signal. Also, the method may include decoding the dedicated control signaling to obtain the control information. In addition, the method may include determining whether the parameter is in the control information.

According to another aspect, the method may include determining that the parameter is in the control information.

According to another aspect, the method may include receiving the signal on a frequency resource in a guard-band or the in-band of the second communication system.

According to another aspect, the method may include receiving the signal on a frequency resource outside a guard-band and the in-band of the second communication system.

According to another aspect, the method may include determining whether the parameter is received via the common signaling in the first wireless communication system.

According to another aspect, the method may include receiving, by the wireless device, a signal on a frequency resource on which the first wireless communication system operates. Further, the signal may include the common signaling having system information. The method may also include obtaining the common signaling from the signal and decoding the common signaling to obtain the system information. In addition, the method may include determining whether the parameter is in the system information.

According to another aspect, the dedicated control signaling may be received on a unicast channel and the common signaling is received on a multicast channel.

According to another aspect, the dedicated control signaling may be received on a physical downlink control channel (PDCCH) and the common signaling is received on a physical broadcast channel (PBCH).

According to one aspect, a wireless device for determining a frequency resource on which to operate in a first wireless communication system is configured to determine whether a parameter is received via dedicated control signaling in the first wireless communication system. Further, a value of the parameter indicates one or more frequency resources in which the first wireless communication system operates. In response to determining that the parameter is received via the dedicated control signaling in the first wireless communication system, the wireless device is further configured to operate on a frequency resource whose location is defined based on the parameter received via such dedicated control signaling, even if the wireless device also receives the same parameter via common signaling that is transmitted to multiple wireless devices in the first wireless communication system.

According to another aspect, the wireless device may be configured to configure the wireless device to operate on a frequency resource whose location is indicated by the parameter via the common signaling in the first wireless communication system responsive to determining that the parameter is not received via the dedicated control signaling.

According to another aspect, the wireless device may be configured to receive a signal on a frequency resource on which the first wireless communication system operates. The signal may include the dedicated control signaling having control information. Further, the wireless device may be configured to obtain the dedicated control signaling from the signal. The wireless device may also be configured to decode the dedicated control signaling to obtain the control information. In addition, the wireless device may be configured to determine whether the parameter is in the control information.

According to another aspect, the wireless device may be further configured to determine that the parameter is in the control information.

According to another aspect, the wireless device may be configured to receive the signal on a frequency resource in a guard-band or the in-band of the second communication system.

According to another aspect, the wireless device may be configured to receive the signal on a frequency resource outside a guard-band and the in-band of the second communication system.

According to another aspect, the wireless device may be configured to determine whether the parameter is received via the common signaling in the first wireless communication system.

According to another aspect, the wireless device may be configured to receive a signal on a frequency resource on which the first wireless communication system operates. Further, the signal may include the common signaling having system information. The wireless device may be configured to obtain the common signaling from the signal and decoding the common signaling to obtain the system information. In addition, the wireless device may be configured to determine whether the parameter is in the system information.

According to one aspect, a wireless device for determining a frequency resource on which to operate in a first wireless communication system includes a dedicated control signaling parameter determining module or unit for determining whether a parameter is received via dedicated control signaling in the first wireless communication system. A value of the parameter indicates one or more frequency resources in which the first wireless communication system operates. The wireless device includes a configuring module or unit for configuring the wireless device to operate on a frequency resource whose location is defined based on the parameter received via such dedicated control signaling responsive to determining that the parameter is received via the dedicated control signaling in the first wireless communication system, even if the wireless device also receives the same parameter via common signaling that is transmitted to multiple wireless devices in the first wireless communication system.

According to another aspect, the configuring module or unit may be further configured for configuring the wireless device to operate on a frequency resource whose location is indicated by the parameter via the common signaling in the first wireless communication system responsive to determining that the parameter is not received via the dedicated control signaling.

According to another aspect, the wireless device may include a receiving module or unit for receiving a signal on a frequency resource on which the first wireless communication system operates. The signal may include the dedicated control signaling having control information. Further, the wireless device may be configured to include a dedicated control signaling obtaining module or unit for obtaining the dedicated control signaling from the signal. Also, the wireless device may be configured to include a dedicated control signaling decoding module or unit for decoding the dedicated control signaling to obtain the control information. In addition, the wireless device may be configured to include a dedicated control signaling parameter determining unit for determining whether the parameter is in the control information.

According to another aspect, the wireless device may be further configured to include a dedicated control signaling parameter determining unit for determining that the parameter is in the control information.

According to another aspect, the wireless device may include a receiving module or unit for receiving the signal on a frequency resource in a guard-band or the in-band of the second communication system.

According to another aspect, the wireless device may include a receiving module or unit for receiving the signal on a frequency resource outside a guard-band and the in-band of the second communication system.

According to another aspect, the wireless device may be configured to include a common signaling parameter determining module or unit for determining whether the parameter is received via the common signaling in the first wireless communication system.

According to another aspect, the wireless device may include a receiving module or unit for receiving a signal on a frequency resource on which the first wireless communication system operates. Further, the signal may include the common signaling having system information. The wireless device may be configured to include a common signaling obtaining module or unit for obtaining the common signaling from the signal and decoding the common signaling to obtain the system information. In addition, the wireless device may be configured to include a common signaling parameter determining module or unit for determining whether the parameter is in the system information.

According to one aspect, a computer program comprising instructions which, when executed by at least one processor of a wireless device, causes the wireless device to perform any of the methods or portions thereof described herein.

According to another aspect, a carrier may include the computer program of the wireless device. Further, the carrier is one of an electronic signal, optical signal, radio signal, or computer readable storage medium.

According to one aspect, a method performed by a network node in a first wireless communication system for determining a frequency resource for a wireless device to operate includes generating dedicated control signaling for a wireless device in the first wireless communication system. The dedicated control signaling includes a parameter. The parameter is transmitted to the wireless device via the dedicated control signaling to indicate to the wireless device to configure itself to operate on a frequency resource whose location is defined based on the parameter received via the dedicated control signaling, even if such wireless device also receives the same parameter via the common signaling. Further, the method includes transmitting the dedicated control signaling to the wireless device in the first wireless communication system.

According to another aspect, the parameter may indicate that one or more frequency resources within a guard-band or in-band of a second wireless communication system are the one or more frequency resources in which the first communication system is operable.

According to another aspect, the parameter may indicate that the one or more frequency resources in which the first communication system is operable is relative to one or more frequency resources of a second wireless communication system.

According to another aspect, the parameter may indicate that one or more frequency resources outside both a guard-band and in-band of a second wireless communication system are the one or more frequency resources in which the first communication system is operable.

According to another aspect, the first wireless communication system may be operable in a guard-band or in-band of a second wireless communication system.

According to another aspect, the first wireless communication system may be operable outside both a guard-band and in-band of a second wireless communication system.

According to another aspect, the method may include generating common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. The method may also include transmitting the common signaling to the multiple wireless devices in the first wireless communication system.

According to another aspect, the method may include determining a value for the parameter that indicates the one or more frequency resources in which the first wireless communication system operates. Further, the method may include generating control information for the first wireless communication system. The control information may include the parameter. The method may also include encoding the control information to obtain the dedicated control signaling for the first wireless communication system.

According to another aspect, the method may include determining a value for the parameter that indicates the one or more frequency resources in which the first wireless communication system operates. The method may also include generating system information for the first wireless communication system. The system information may include the parameter. In addition, the method may include encoding the system information to obtain the common signaling for the first wireless communication system.

According to another aspect, the method may include transmitting the dedicated control signaling in a guard-band or the in-band of the second communication system.

According to another aspect, the dedicated control signaling may be transmitted on a unicast channel and the common signaling may be transmitted on a multicast channel.

According to another aspect, the dedicated control signaling may be transmitted on a physical downlink control channel (PDCCH) and the common signaling may be transmitted on a physical broadcast channel (PBCH).

According to one aspect, a network node for determining a frequency resource for a wireless device to operate in a first wireless communication system is configured to generate dedicated control signaling for one of a plurality of wireless devices in the first wireless communication system. The dedicated control signaling includes a parameter. Also, the parameter is transmitted to such wireless device via the dedicated control signaling to indicate to such wireless device to configure itself to operate on a frequency resource whose location is defined based on the parameter received via the dedicated control signaling, even if such wireless device also receives the same parameter via the common signaling. Further, the network node is configured to transmit the dedicated control signaling to the wireless device in the first wireless communication system.

According to another aspect, the network node may be configured to generate common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. The network node may also be configured to transmit the common signaling to the multiple wireless devices in the first wireless communication system.

According to another aspect, the network node may be configured to determine a value for the parameter that indicates the one or more frequency resources in which the first wireless communication system operates. Further, the network node may be configured to generate control information for the first wireless communication system. The control information may include the parameter. The network node may also be configured to encode the control information to obtain the common signaling for the first wireless communication system.

According to another aspect, the network node may be configured to determine a value for the parameter that indicates the one or more frequency resources in which the first wireless communication system operates. Further, the network node may be configured to generate system information for the first wireless communication system. The system information may include the parameter. The network node may also be configured to encode the system information to obtain the common signaling for the first wireless communication system.

According to another aspect, the network node may be configured to transmit the dedicated control signaling in a guard-band or the in-band of the second communication system.

According to one aspect, a network node for determining a frequency resource for a wireless device to operate in a first wireless communication system includes a dedicated control signaling generator module for generating dedicated control signaling for one of the plurality of wireless devices in the first wireless communication system. The dedicated control signaling includes a parameter. The parameter is transmitted to such wireless device via the dedicated control signaling to indicate to such wireless device to configure itself to operate on a frequency resource whose location is defined based on the parameter received via the dedicated control signaling, even if such wireless device also receives the same parameter via the common signaling. Further, the network node includes a transmitter circuit for transmitting the dedicated control signaling to the wireless device in the first wireless communication system.

According to another aspect, the network node may include a common signaling generator module or unit for generating common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. The network node may also be configured to transmit the common signaling to the multiple wireless devices in the first wireless communication system.

According to another aspect, the network node may include a dedicated control signaling parameter determining module or unit for determining a value for the parameter that indicates the one or more frequency resources in which the first wireless communication system operates. Further, the network node may include control information generating module or unit for generating control information for the first wireless communication system. The control information may include the parameter. The network node may also include a dedicated control signaling encoding module or unit for encoding the control information to obtain the dedicated control signaling for the first wireless communication system.

According to another aspect, the network node may include a common signaling parameter determining module or unit for determining a value for the parameter that indicates the one or more frequency resources in which the first wireless communication system operates. Further, the network node may include a system information generating module or unit for generating system information for the first wireless communication system. The system information may include the parameter. The network node may also include a common signaling encoder module or unit for encoding the system information to obtain the common signaling for the first wireless communication system.

According to another aspect, the network node may include a transmitting module or unit for transmitting the dedicated control signaling in a guard-band or the in-band of the second communication system.

According to one aspect, a computer program comprising instructions which, when executed by at least one processor of a network node, causes the network node to perform any of the methods or portions thereof described herein.

According to another aspect, a carrier containing the computer program of the network node is one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 12 illustrates one embodiment of a method by a network node for determining a frequency resource for a wireless device to operate in a wireless communication system in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1A:
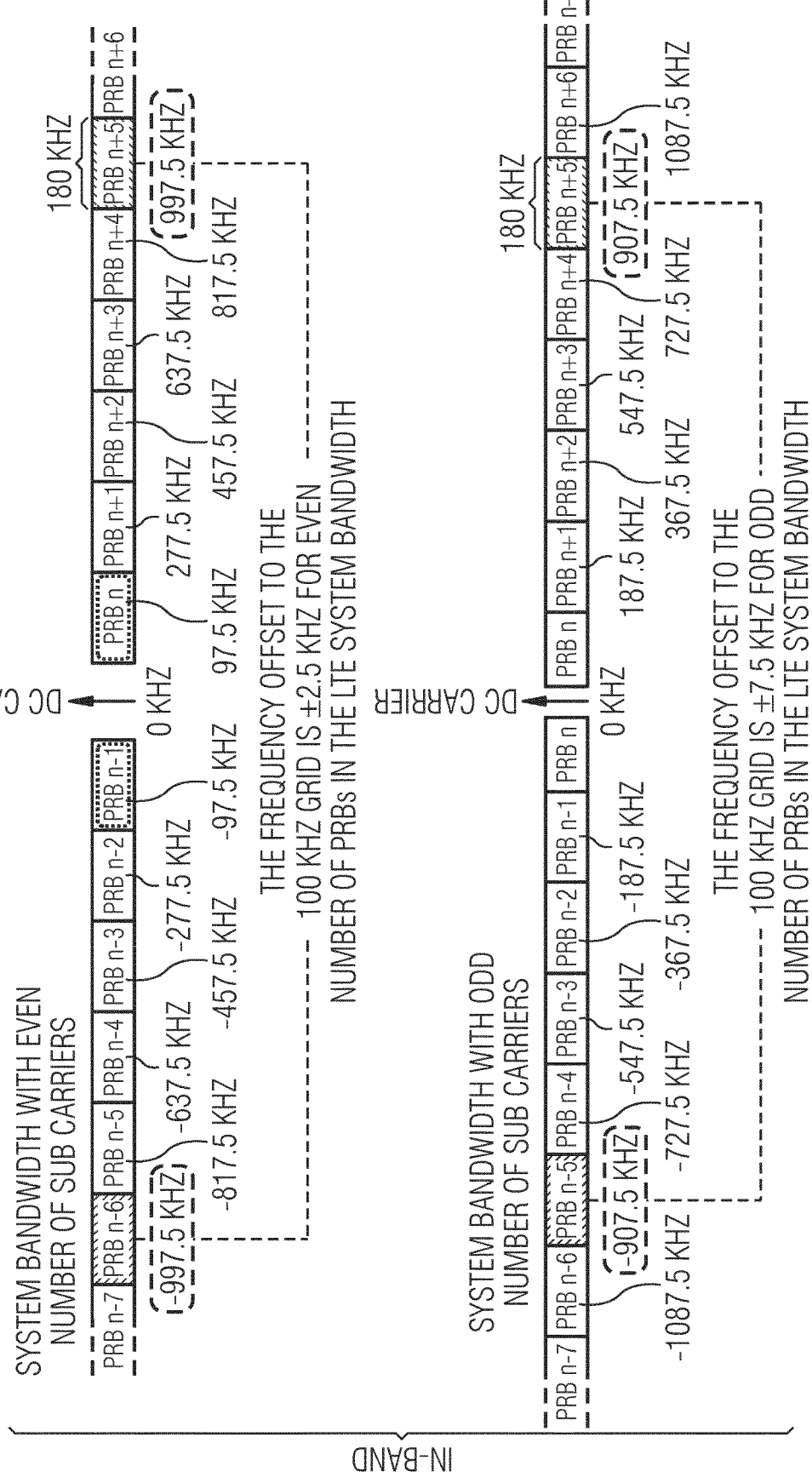
FIGS. 1A-C illustrate possible NB-IoT carriers for NB-IoT anchor cell deployment in guard-band and in-band of an LTE system.
Figures 1B, 1C:
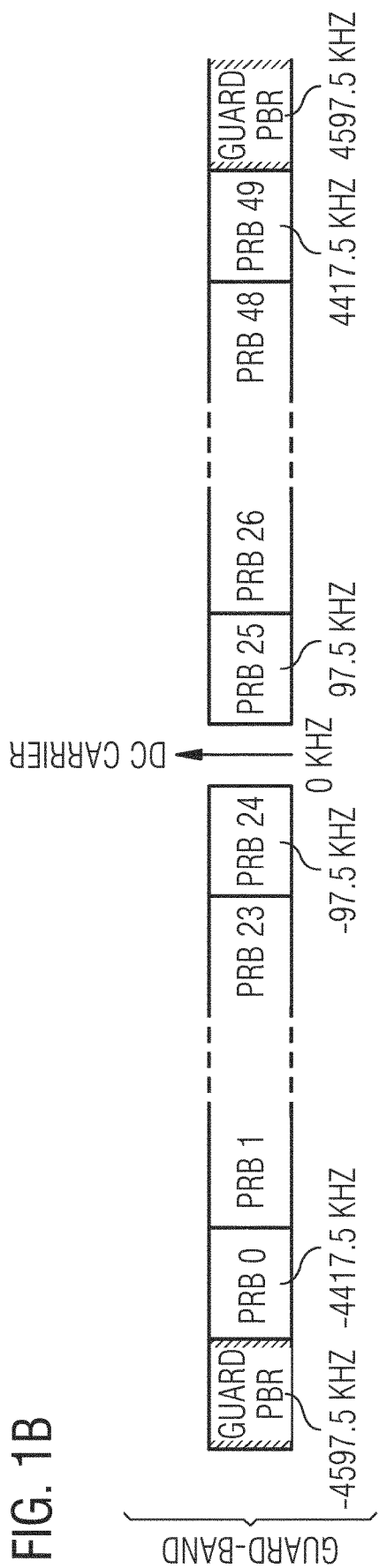
Figure 2:
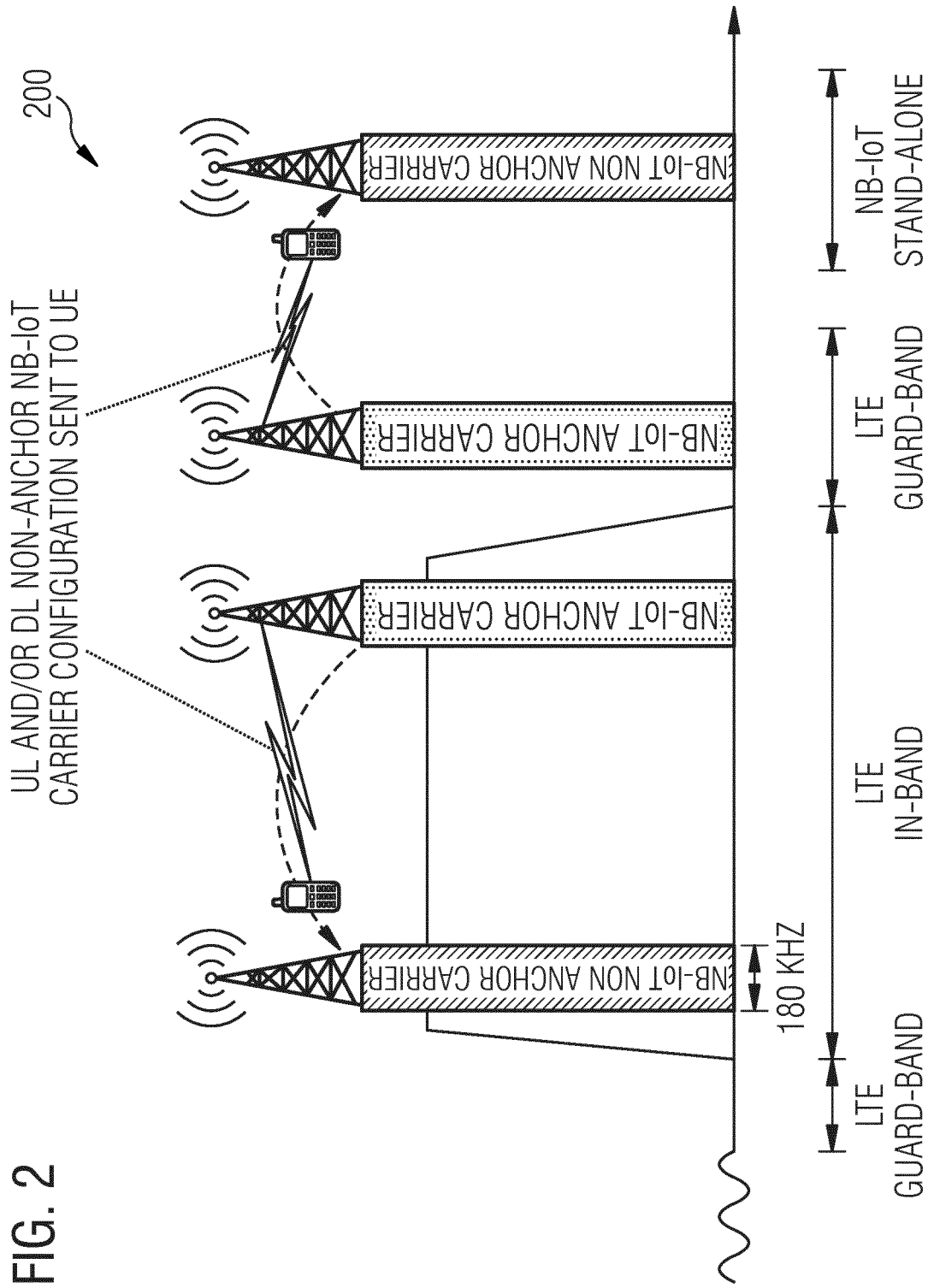
FIG. 2 illustrates an example of wireless devices configured from an anchor carrier to a non-anchor carrier.
Figure 3:
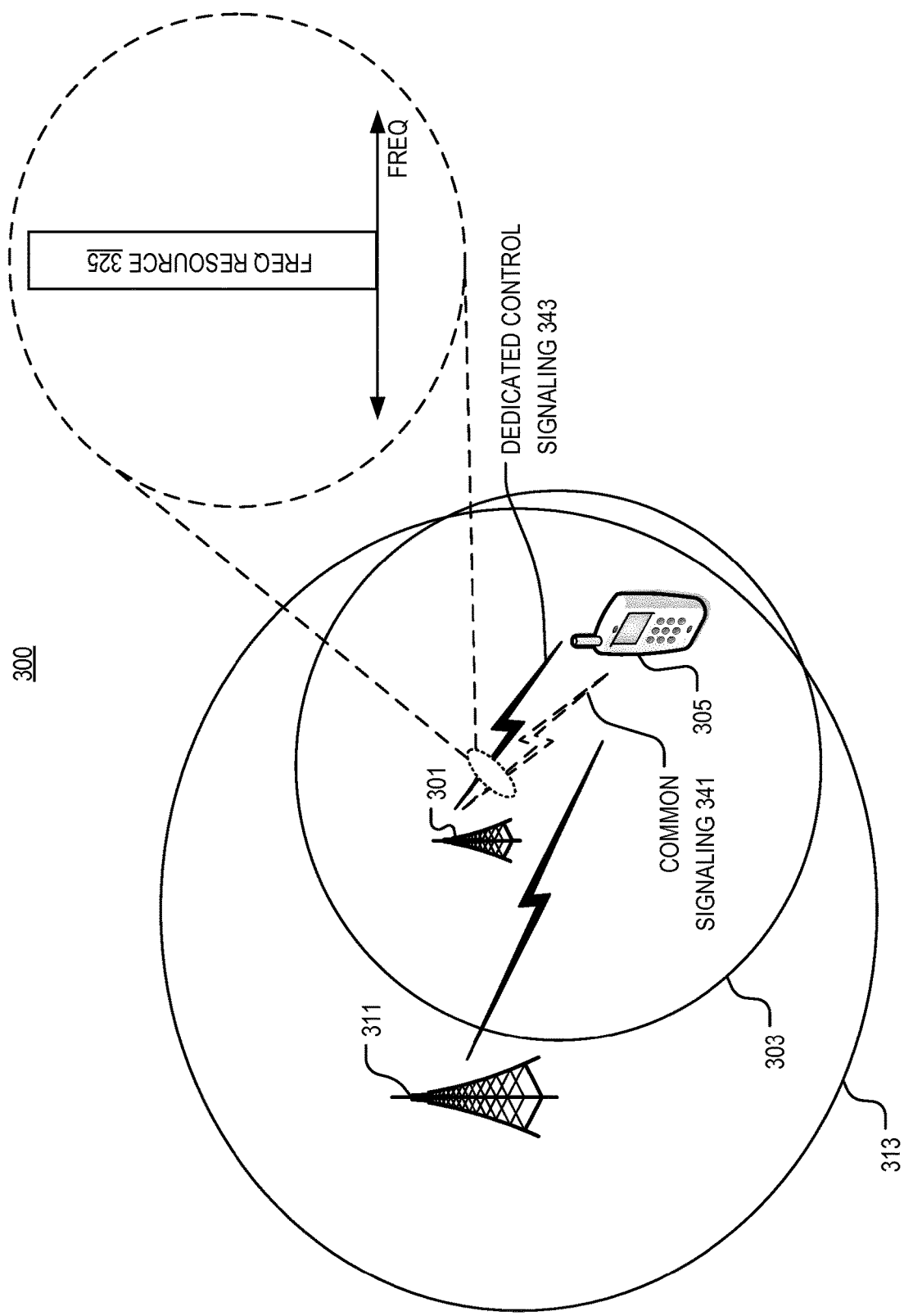
FIG. 3 illustrates one embodiment of a system for determining a frequency resource for a wireless device to operate in a wireless communication system in accordance with various aspects as described herein.

This disclosure describes systems and methods of determining a frequency resource for a wireless device to operate in a wireless communication system. Further, this disclosure describes a flexible means to configure in-band parameters in dedicated control signaling or a system information block in common signaling, which may depend on an expected number of wireless devices (e.g., UEs) to be reconfigured. Problems with existing solutions include that the UE is required to receive certain LTE carrier parameters before it may be reconfigured for an in-band non-anchor carrier. Further, these parameters substantially increase the message size resulting in a large signaling overhead, especially when many UEs are re-directed. Accordingly, there is a need for techniques to improve determining a frequency resource for a wireless device to operate in a wireless communication system. Furthermore, other desirable features and characteristics of the present disclosure may become apparent from the subsequent detailed description and claims, taken in conjunction with the accompanying figures and the foregoing technical field and background. For example, FIG. 3 illustrates a first and a second wireless communication system, e.g., served by respective first and second network nodes 301 and 311 that may be the same or different. The first system (e.g., a Narrowband IoT system) is deployed on one or more frequency resources 325. In one example, a frequency resource may be a range of contiguous frequencies, a physical resource block (PRB), or the like. In another example, a frequency resource may be a single subcarrier, multiple contiguous subcarriers, or the like. Regardless, the second system (e.g., wideband LTE) is deployed on frequency resources.

In another embodiment, the system may include the first network node 301 with coverage area 303 and a second network node 311 with coverage area 313. The first network node 301 may be configured to support a first wireless communication system. In one example, the first wireless communication system may be one more narrowband communication systems such as NB-IoT. Further, the first network node 301 may be a base station, an access point, a wireless router, or the like. The first network node 301 may serve wireless device 305. The second network node 311 may be configured to support a second wireless communication system. In one example, the second wireless communication system may be one or more wideband communication systems such as LTE, LTE-NX, UMTS, GSM, or the like. Further, the second network node 311 may be a base station, an access point, a wireless router, or the like. The second network node 311 may also serve the wireless device 305. The first network node 301 and the second network node 311 may be the same network node or different network nodes.

In another embodiment, the first network node 301 may communicate with the wireless device 305 in the first wireless communication system using signaling. The first network node 301 may transmit common signaling 341 or dedicated control signaling 343 to the wireless device 305 in the first wireless communication system. The first network node 301 may transmit the common signaling 341 to multiple wireless devices in the first wireless communication system. In one example, the first network node 301 may transmit the common signaling 341 on a multicast channel to multiple wireless devices in the first wireless communication system. In another example, the first network node 301 may transmit the common signaling 341 on a Physical Broadcast Channel (PBCH). The common signaling 341 may include system information for multiple wireless devices operating in the first wireless communication system. The system information may include a parameter that indicates to the multiple wireless devices one or more frequency resources in which the first wireless communication system operates.

Furthermore, the first network node 301 may transmit the dedicated control signaling 343 to the wireless device 305 in the first wireless communication system. For example, the first network node 301 may transmit the dedicated control signaling 343 on a unicast channel to the wireless device 305 in the first wireless communication system. In another example, the first network node 301 may transmit the dedicated control signaling 343 on a Physical Downlink Control Channel (PDCCH) to the wireless device 305 in the first wireless communication system. The dedicated control signaling 343 may include control information for a wireless device operating in the first wireless communication system. Further, the control information may include a parameter that indicates to a wireless device one or more frequency resources in which the first wireless communication system operates. A value of the parameter in the system information of the common signaling 341 may be the same or different than a value of the parameter in the control information of the dedicated control signaling 343.

In another embodiment, the first network node 301 may generate the dedicated control signaling 343 for the wireless device 305 in the first wireless communication system. The dedicated control signaling 343 may include a parameter used to indicate to the wireless device 305 to configure itself to operate on a frequency resource whose location is defined based on such parameter being received by the wireless device 305 using the dedicated control signaling 343, even if such parameter is also received by the wireless device 305 using the common signaling 341. Further, the first network node 301 may transmit the dedicated control signaling to the wireless device 305 on a frequency resource on which the first wireless communication system operates.

Moreover, the wireless device 305 may receive the dedicated control signaling 343 having the parameter on the frequency resource on which the first wireless communication system operates. The wireless device 305 may determine whether the parameter is received via the dedicated control signaling 343 in the first wireless communication system. Further, a value of the parameter received from the dedicated control signaling 343 may indicate one or more frequency resources 325 in which the first wireless communication system operates. In response to determining that the parameter is received via the dedicated control signaling 343 in the first wireless communication system, the wireless device 305 may configure itself to operate on a frequency resource whose location is defined based on the parameter received via the dedicated control signaling 343, even if the wireless device 305 also received the same parameter via the common signaling 341 that is transmitted to multiple wireless devices in the first wireless communication system.

Figure 4:
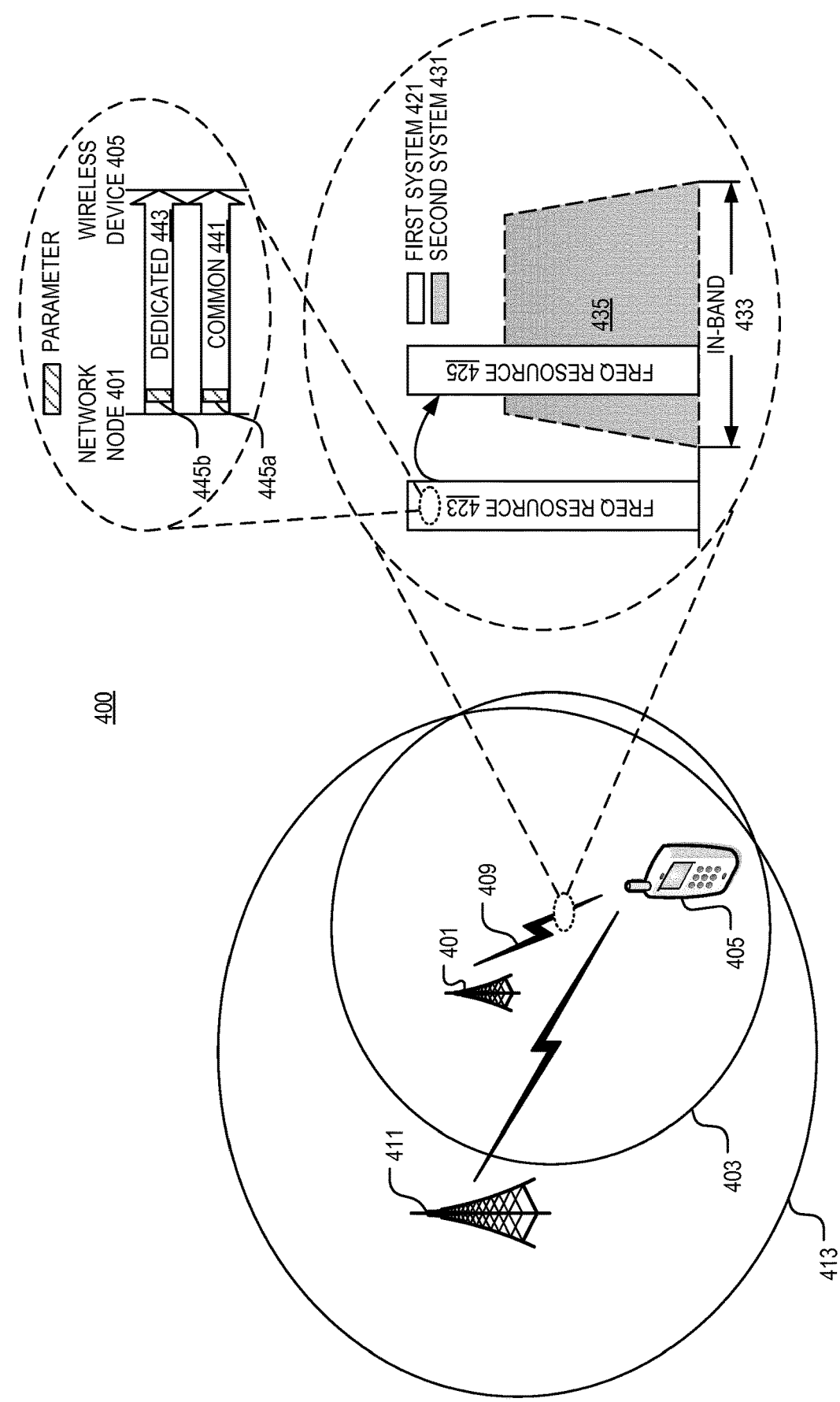
FIG. 4 illustrates another embodiment of a system for determining a frequency resource for a wireless device to operate in a wireless communication system in accordance with various aspects as described herein.

FIG. 4 illustrates another embodiment of a system 400 for determining a frequency resource for a wireless device 405 to operate in a wireless communication system in accordance with various aspects as described herein. In FIG. 4, a first system 421 (e.g., a Narrowband IoT system) may be deployed on one or more frequency resources 423, 425. A second system 431 (e.g., wideband LTE) may be deployed in-band 433 on frequency resources 435. The first system 421 may include the first network node 401 with coverage area 403. Further, the second system 431 may include a second network node 411 with coverage area 413. The first network node 401 may be configured to support the first wireless communication system 421. Further, the first network node 401 may be a base station, an access point, a wireless router, or the like. The first network node 401 may serve wireless device 405. The second network node 411 may be configured to support the second wireless communication system 431. Also, the second network node 411 may be a base station, an access point, a wireless router, or the like. The second network node 411 may also serve the wireless device 405. The first network node 401 and the second network node 411 may be the same network node or different network nodes.

In FIG. 4, the first network node 401 may communicate with the wireless device 405 in the first wireless communication system 421 using signaling. The first network node 401 may transmit common signaling 441 or dedicated control signaling 443 to the wireless device 405 in the first wireless communication system 421. The first network node 401 may transmit the common signaling 441 to multiple wireless devices in the first wireless communication system 421. In one example, the first network node 401 may transmit the common signaling 441 on a multicast channel to multiple wireless devices in the first wireless communication system 421. In another example, the first network node 401 may transmit the common signaling 441 on a Physical Broadcast Channel (PBCH). The common signaling 441 may include system information for multiple wireless devices operating in the first wireless communication system 421. The system information may include a parameter 445a that indicates to the multiple wireless devices one or more frequency resources 425 in which the first wireless communication system 421 operates.

Furthermore, the first network node 401 may transmit the dedicated control signaling 443 to the wireless device 405 in the first wireless communication system 421. For example, the first network node 401 may transmit the dedicated control signaling 443 on a unicast channel to the wireless device 405 in the first wireless communication system 421. In another example, the first network node 401 may transmit the dedicated control signaling 443 on a Physical Downlink Control Channel (PDCCH) to the wireless device 405 in the first wireless communication system 421. The dedicated control signaling 443 may include control information for a wireless device operating in the first wireless communication system 421. Further, the control information may include a parameter 445b that indicates to a wireless device the one or more frequency resources 425 in which the first wireless communication system 421 operates. A value of the parameter 445a in the system information of the common signaling 441 may be the same or different than a value of the parameter 445b in the control information of the dedicated control signaling 443.

In another embodiment, the first network node 401 may generate the dedicated control signaling 443 for the wireless device 405 in the first wireless communication system 421. The dedicated control signaling 443 may include the parameter 445b used to indicate to the wireless device 405 to configure itself to operate on a frequency resource whose location is defined based on such parameter being received by the wireless device 405 using the dedicated control signaling 443, even if the same parameter 445a is also received by the wireless device 405 using the common signaling 441. Further, the first network node 401 may transmit the dedicated control signaling 443 to the wireless device 405 on a frequency resource 423 on which the first wireless communication system 421 operates.

Moreover, the wireless device 405 may receive the dedicated control signaling 443 having the parameter 445b on the frequency resource 423 on which the first wireless communication system 421 operates. The wireless device 405 may determine whether the parameter 445b is received via the dedicated control signaling 443 in the first wireless communication system 421. Further, a value of the parameter 445b received from the dedicated control signaling 443 may indicate one or more frequency resources 425 in which the first wireless communication system 421 operates. In response to determining that the parameter 445b is received via the dedicated control signaling 443 in the first wireless communication system 421, the wireless device 405 may configure itself to operate on a frequency resource 425 whose location is defined based on the parameter 445b received via the dedicated control signaling 443, even if the wireless device 405 also received the same parameter 445a via the common signaling 441 that is transmitted to multiple wireless devices in the first wireless communication system 421.

Figure 5:
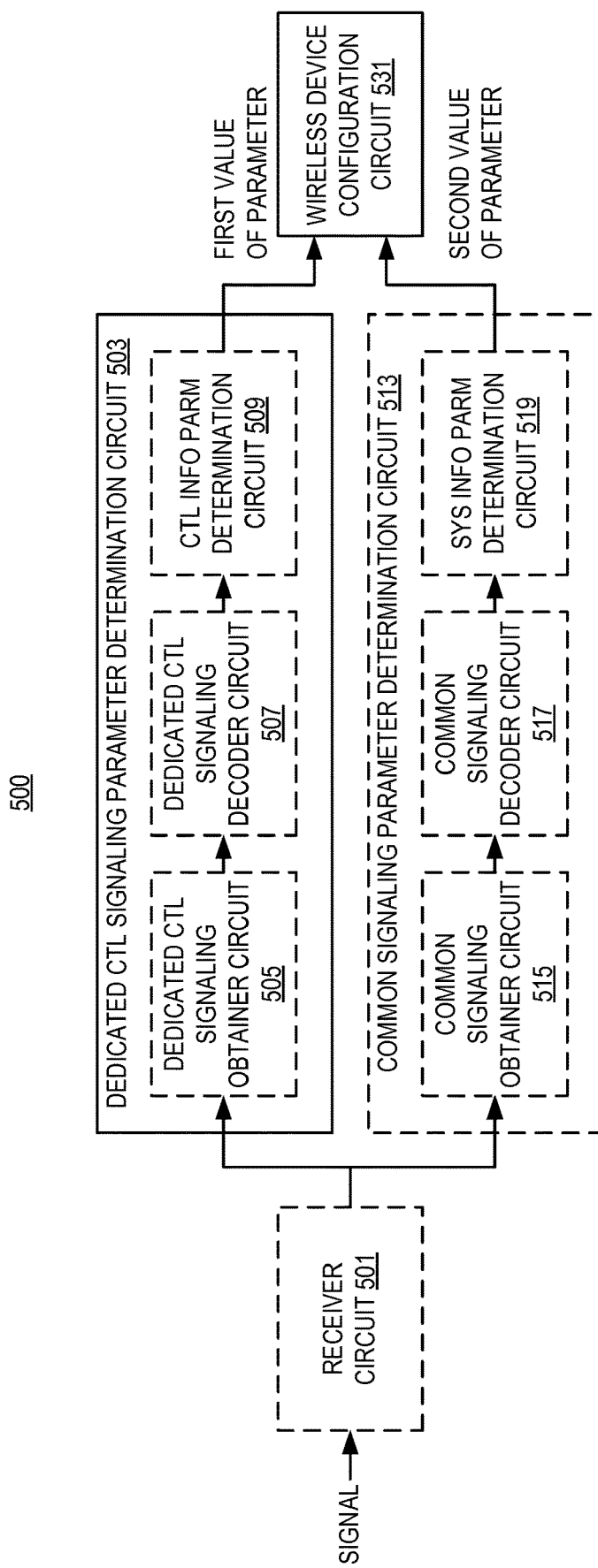
FIG. 5 illustrates one embodiment of a wireless device for determining a frequency resource for which to operate in a wireless communication system in accordance with various aspects as described herein.

FIG. 5 illustrates one embodiment of a wireless device 500 for determining a frequency resource for which to operate in a wireless communication system in accordance with various aspects as described herein. In FIG. 5, the wireless device 500 may include a receiver circuit 501, a dedicated control signaling parameter determination circuit 503, a common signaling parameter determination circuit 513, a wireless device configuration circuit 531, the like, or any combination thereof. The receiver circuit 501 may be configured to receive a signal on a frequency resource on which a first wireless communication system operates (e.g., NB-IoT). Further, the signal may include dedicated control signaling having control information or common signaling having system information. The dedicated control signaling parameter determination circuit 503 may be configured to determine whether a parameter is received via dedicated control signaling in the first wireless communication system. A value of the parameter may indicate one or more frequency resources in which the first wireless communication system operates.

In FIG. 5, the dedicated control signaling parameter determination circuit 503 may include a dedicated control signaling obtainer circuit 505, a dedicated control signaling decoder circuit 507, a dedicated control parameter determination circuit 509, the like, or any combination thereof. The dedicated control signaling obtainer circuit 505 may be configured to obtain the dedicated control signaling from the signal. The dedicated control signaling decoder circuit 507 may be configured to decode the dedicated control signaling to obtain the control information. The dedicated control parameter determination circuit 509 may be configured to determine whether the parameter is in the control information.

In this embodiment, the common signaling parameter determination circuit 513 may be configured to determine whether the parameter is received via the common signaling in the first wireless communication system. The common signaling parameter determination circuit 513 may include a common signaling obtainer circuit 515, a common signaling decoder circuit 517, a common signaling parameter determination circuit 519, the like, or any combination thereof. The commons signaling obtainer circuit 515 may be configured to obtain the common signaling from the signal. The common signaling decoder circuit 517 may be configured to decode the common signaling from the signal. The common signaling parameter determination circuit 519 may be configured to determine whether the parameter is in the system information.

In FIG. 5, the wireless device configuration circuit 531 may be configured to configure the wireless device to operate on a frequency resource whose location is defined based on the parameter received via such dedicated control signaling (even if the wireless device also receives the same parameter via common signaling that is transmitted to multiple wireless devices in the first wireless communication system), which may be responsive to determining that the parameter is received via the dedicated control signaling in the first wireless communication system. Further, the wireless device configuration circuit 531 may be configured to configure the wireless device to operate on a frequency resource whose location is indicated by the parameter via the common signaling in the first wireless communication system, which may be responsive to determining that the parameter is not received via the dedicated control signaling.

Figure 6:
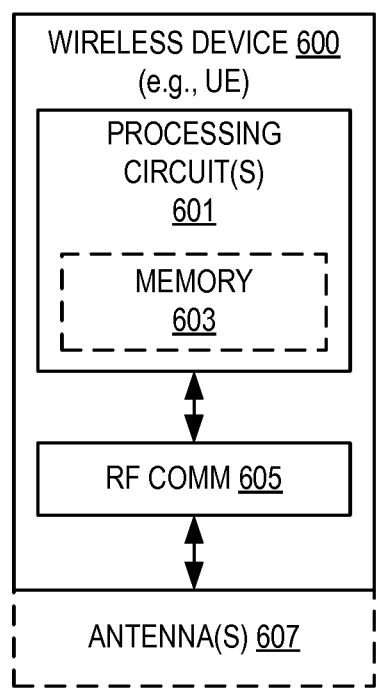
FIG. 6 illustrates another embodiment of a wireless device for determining a frequency resource for which to operate in a wireless communication system in accordance with various aspects as described herein.

FIG. 6 illustrates another embodiment of a wireless device 600 for determining a frequency resource for which to operate in a wireless communication system in accordance with various aspects as described herein. In FIG. 6, the wireless device 600 (e.g., UE) may include processing circuit(s) 601, radio frequency (RF) communications circuit(s) 605, antenna(s) 607, the like, or any combination thereof. The communication circuit(s) 605 may be configured to transmit or receive information to or from one or more network nodes via any communication technology. This communication may occur using the one or more antennas 607 that are either internal or external to the wireless device 600. The processing circuit(s) 601 may be configured to perform processing as described herein (e.g., the method of FIGS. 8, 14, and 16-17) such as by executing program instructions stored in memory 603. The processing circuit(s) 601 in this regard may implement certain functional means, units, or modules.

Figure 7A:
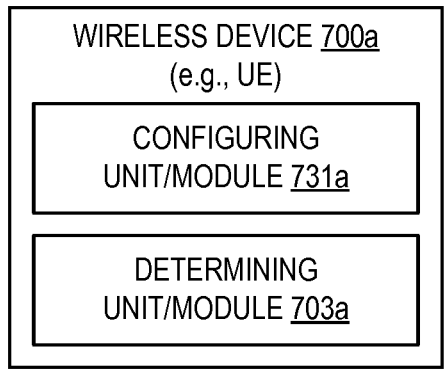
FIGS. 7A-B illustrate other embodiments of a wireless device for determining a frequency resource for which to operate in a wireless communication system in accordance with various aspects as described herein.
Figure 7B:
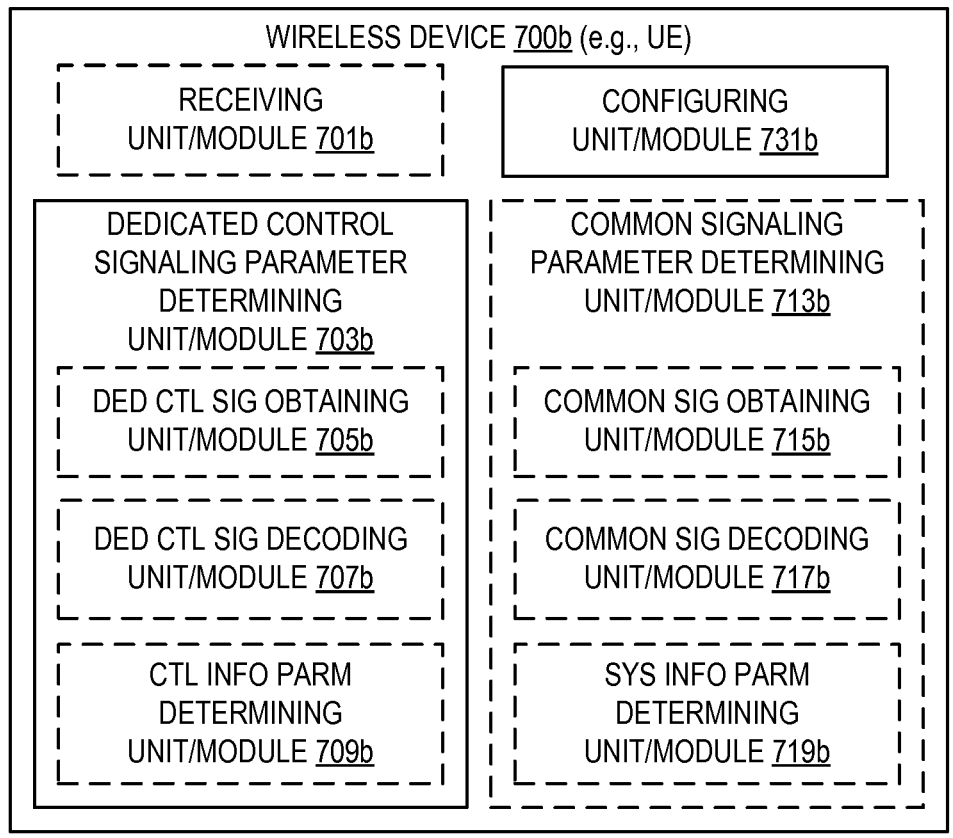

FIGS. 7A-B illustrate other embodiments of a wireless device 700*a,b* for determining a frequency resource for which to operate in a wireless communication system in accordance with various aspects as described herein. In FIG. 7A, the wireless device 700*a* (e.g., UE) may implement various functional means, units, or modules (e.g., via the processing circuit(s) 601 in FIG. 6 or via software code). These functional means, units, or modules (e.g., for implementing the method of FIGS. 8, 14, and 16-17) may include a determining module or unit 703*a* for determining whether a parameter is received via dedicated control signaling or common signaling in the first wireless communication system. A value of the parameter indicates one or more frequency resources in which the first wireless communication system operates. These functional means, units, or modules may also include a configuring module or unit 731*a* for configuring the wireless device to operate on a frequency resource whose location is defined based on the parameter received via such dedicated control signaling (even if the wireless device also receives the same parameter via common signaling that is transmitted to multiple wireless devices in the first wireless communication system), which may be responsive to determining that the parameter is received via the dedicated control signaling in the first wireless communication system. Further, the configuring module or unit 731*a* may be configured to configure the wireless device to operate on a frequency resource whose location is indicated by the parameter via the common signaling in the first wireless communication system, which may be responsive to determining that the parameter is not received via the dedicated control signaling or is received via the common signaling.

In FIG. 7B, the wireless device 700*b* may implement various functional means, units, or modules (e.g., via the processing circuit(s) 601 in FIG. 6 or via software code). These functional means, units, or modules (e.g., for implementing the method of FIGS. 8, 14, and 16-17) may include a receiving module or unit 701*b* for receiving a signal on a frequency resource on which a first wireless communication system operates. Further, the signal may include dedicated control signaling having control information or common signaling having system information. These functional means, units, or modules may include a dedicated control signaling parameter determining module or unit 703*b* for determining whether a parameter is received via the dedicated control signaling in the first wireless communication system. A value of the parameter may indicate one or more frequency resources in which the first wireless communication system operates.

In FIG. 7B, the dedicated control signaling parameter determining module or unit 703*b* may include a dedicated control signaling obtaining module or unit 705*b*, a dedicated control signaling decoding module or unit 707*b*, a control information parameter determining module or unit 709*b*, the like, or any combination thereof. The dedicated control signaling obtaining module or unit 705*b* may include obtaining the dedicated control signaling from the signal. The dedicated control signaling decoding module or unit 707*b* may include decoding the dedicated control signaling to obtain the control information. The dedicated control parameter determining module or unit 709*b* may include determining whether the parameter is in the control information.

In this embodiment, these functional means, units, or modules may include a common signaling parameter determining module or unit 713*b* for determining whether the parameter is received via the common signaling in the first wireless communication system. The common signaling parameter determining module or unit 713*b* may include a common signaling obtaining module or unit 715*b*, a common signaling decoding module or unit 717*b*, a system information parameter determining module or unit 719*b*, the like, or any combination thereof. The commons signaling obtaining module or unit 713*b* may include obtaining the common signaling from the signal. The common signaling decoding module or unit 717*b* may include decoding the common signaling from the signal. The system information parameter determining module or unit 719*b* may be configured to determine whether the parameter is in the system information.

In FIG. 7B, these functional means, units, or modules may include a wireless device configuring module or unit 731*b* for configuring the wireless device to operate on a frequency resource whose location is defined based on the parameter received via such dedicated control signaling (even if the wireless device also receives the same parameter via common signaling that is transmitted to multiple wireless devices in the first wireless communication system), which may be responsive to determining that the parameter is received via the dedicated control signaling in the first wireless communication system. Further, the wireless device configuring module or unit 731*b* may include configuring the wireless device to operate on a frequency resource whose location is indicated by the parameter via the common signaling in the first wireless communication system, which may be responsive to determining that the parameter is not received via the dedicated control signaling.

Figure 8:
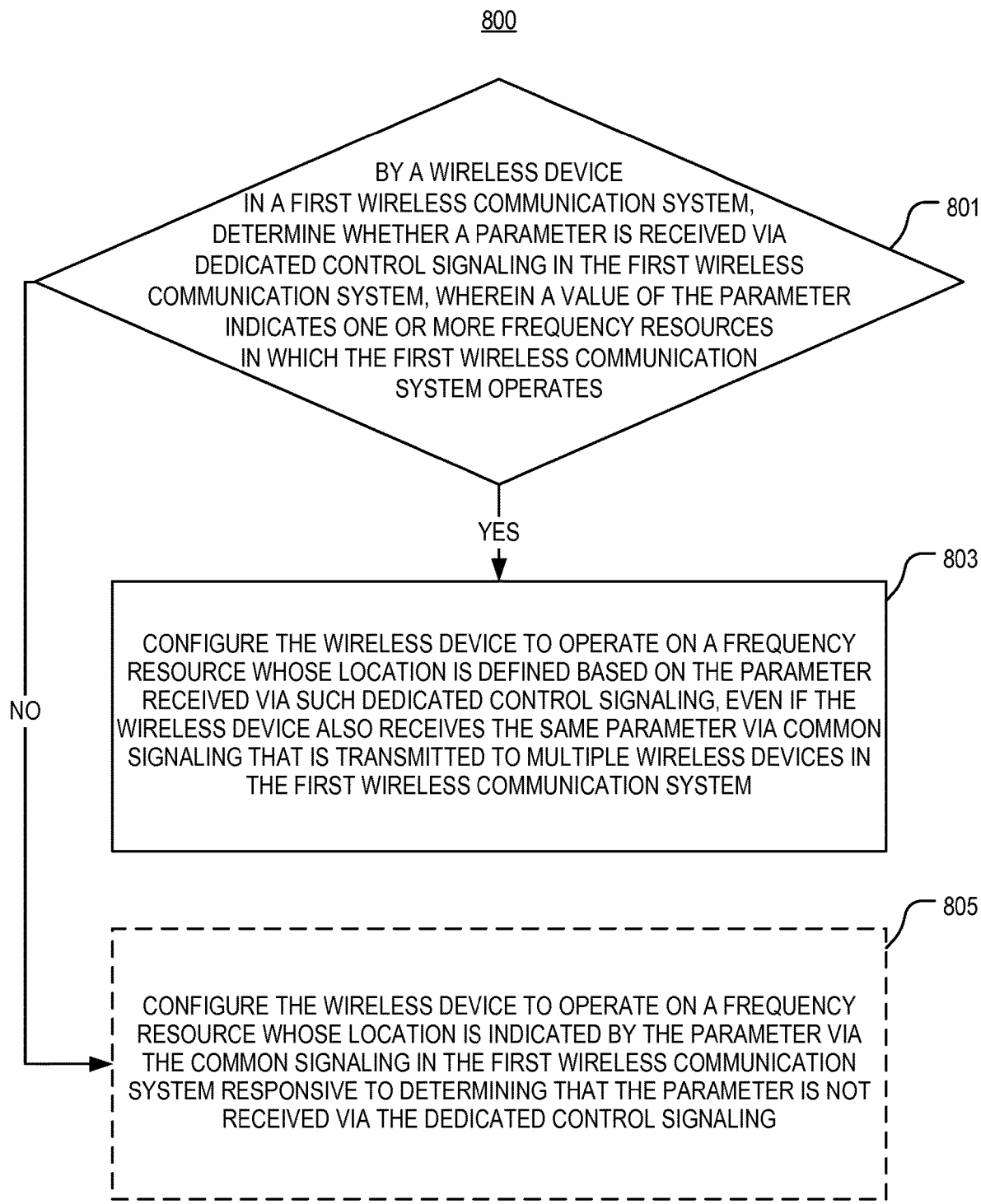
FIG. 8 illustrates one embodiment of a method by a wireless device for determining a frequency resource for which to operate in a wireless communication system in accordance with various aspects as described herein.

FIG. 8 illustrates one embodiment of a method 800 by a wireless device for determining a frequency resource for which to operate in a wireless communication system in accordance with various aspects as described herein. In FIG. 8, the method 800 may start, for instance, at block 801 where it may include determining whether a parameter is received via dedicated control signaling in a first wireless communication system. A value of the parameter may indicate one or more frequency resources in which the first wireless communication system operates. If so, then, at block 803, the method 800 may include configuring the wireless device to operate on a frequency resource whose location is defined based on the parameter received via such dedicated control signaling (even if the wireless device also receives the same parameter via common signaling that is transmitted to multiple wireless devices in the first wireless communication system). Otherwise, at block 805, the method 800 may include configuring the wireless device to operate on a frequency resource whose location is indicated by the parameter received via the common signaling in the first wireless communication system.

Figure 16:
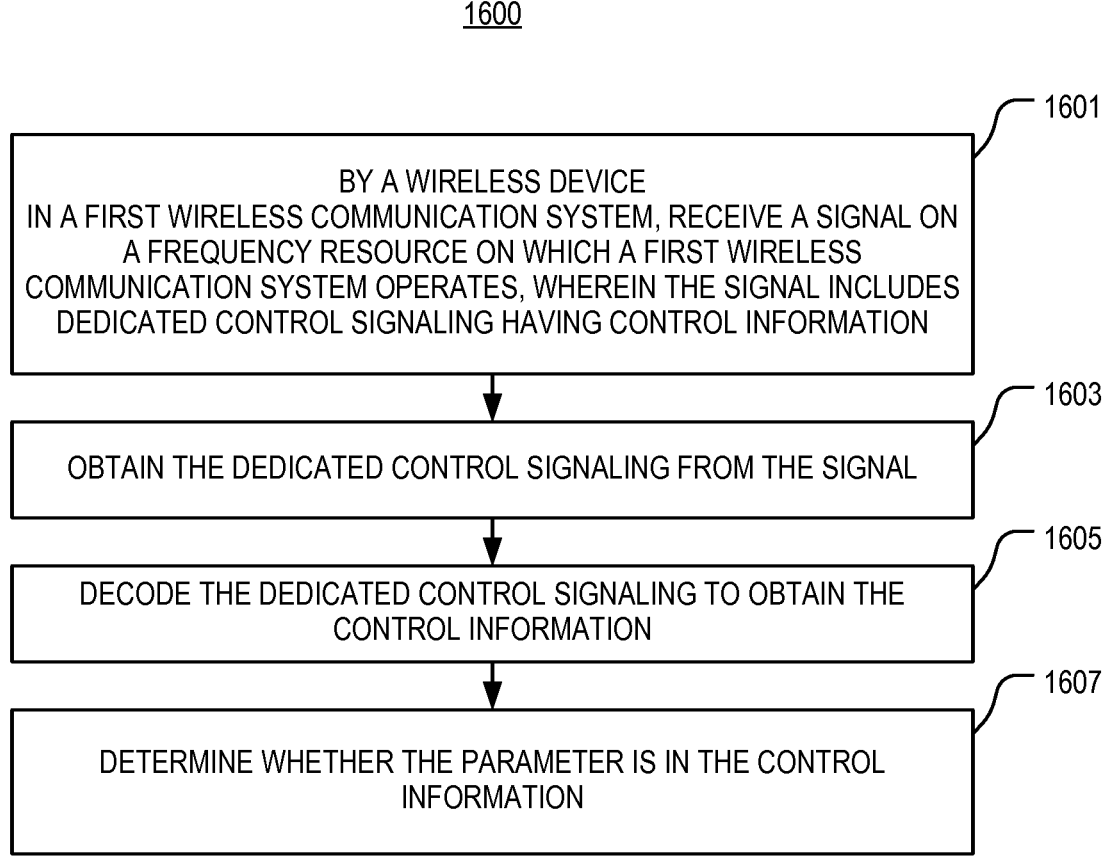
FIG. 16 illustrates one embodiment of a method by a wireless device for determining whether a parameter is received via dedicated control signaling in a first wireless communication system in accordance with various aspects as described herein.
Figure 17:
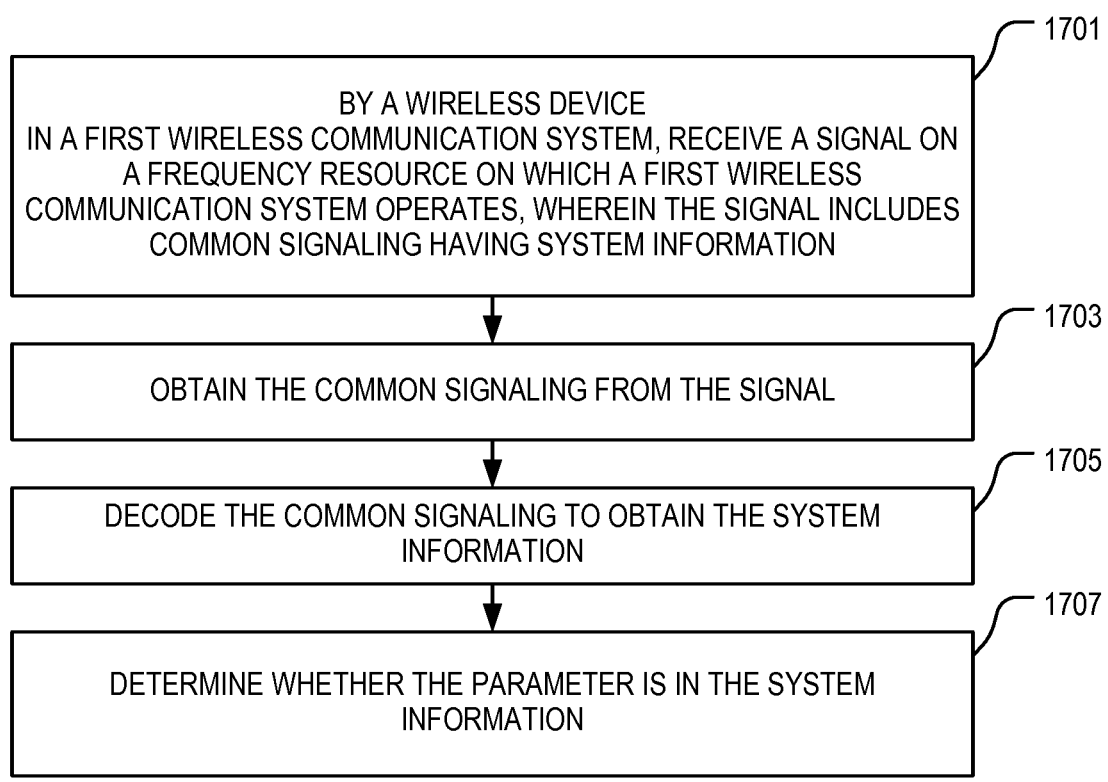
FIG. 17 illustrates one embodiment of a method by a wireless device for determining whether a parameter is received via common signaling in a first wireless communication system in accordance with various aspects as described herein.

FIG. 16 illustrates one embodiment of a method 1600 by a wireless device for determining whether a parameter is received via dedicated control signaling in a first wireless communication system in accordance with various aspects as described herein. In FIG. 16, the method 1600 may start, for instance, at block 1601 where it may include receiving, by the wireless device, a signal on a frequency resource on which a first wireless communication system operates. Further, the signal may include dedicated control signaling having control information. At block 1603, the method 1600 may include obtaining the dedicated control signaling from the signal. At block 1605, the method 1600 may include decoding the dedicated control signaling to obtain the control information. At block 1607, the method 1600 may include determining whether the parameter is in the control information FIG. 17 illustrates one embodiment of a method 1700 by a wireless device for determining whether a parameter is received via common signaling in a first wireless communication system in accordance with various aspects as described herein. In FIG. 17, the method 1700 may include receiving, by the wireless device, a signal on a frequency resource on which a first wireless communication system operates. The signal may include common signaling having system information. At block 1703, the method 1700 may include obtaining the common signaling from the signal. At block 1705, the method 1700 may include decoding the common signaling to obtain the system information. At block 1707, the method 1700 may include determining whether the parameter is in the system information.

Figure 9:
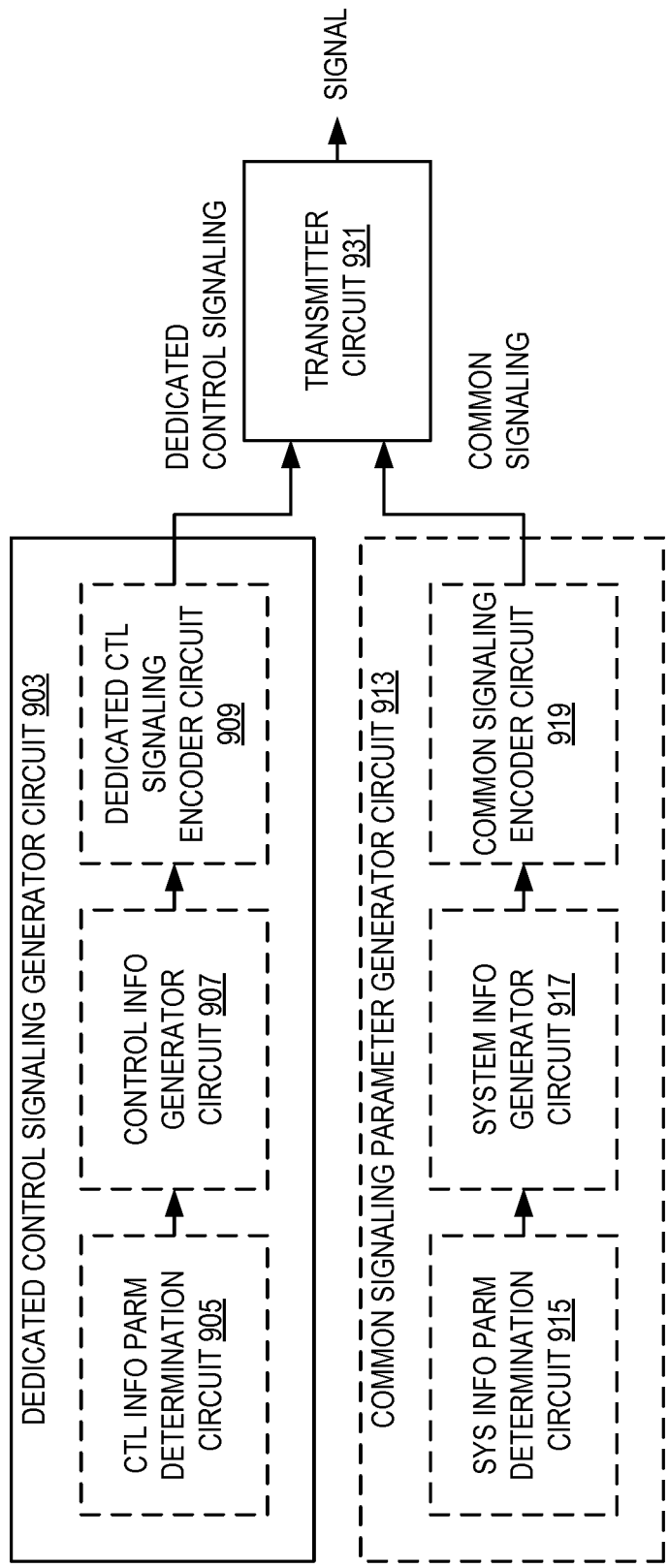
FIG. 9 illustrates one embodiment of a network node for determining a frequency resource for a wireless device to operate in a wireless communication system in accordance with various aspects as described herein.

FIG. 9 illustrates one embodiment of a network node 900 for determining a frequency resource for a wireless device to operate in a wireless communication system in accordance with various aspects as described herein. In FIG. 9, the network node 900 may include a dedicated control signaling generator circuit 903, a common signaling parameter generator circuit 913, a transmitter circuit 931, the like, or any combination thereof. The dedicated control signaling generator circuit 903 may be configured to generate dedicated control signaling for a wireless device in a first wireless communication system. The dedicated control signaling may include a parameter. Further, the parameter may be transmitted to the wireless device via the dedicated control signaling to indicate to the wireless device to configure itself to operate on a frequency resource whose location is defined based on the parameter received via the dedicated control signaling (even if such wireless device also receives the same parameter via the common signaling). The common signaling parameter generator circuit 913 may be configured to generate common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system.

In FIG. 9, the dedicated control signaling generator circuit 903 may include a control information parameter determination circuit 905, a control information generator circuit 907, a dedicated control signaling encoder circuit 909, the like, or any combination thereof. The control information parameter determination circuit 905 may be configured to determine a value for the parameter that indicates the one or more frequency resources in which the first wireless communication system operates. The control information generator circuit 907 may be configured to generate control information for the first wireless communication system. Further, the control information may include the parameter. The dedicated control signaling encoder circuit 909 may be configured to encode the control information to obtain the common signaling for the first wireless communication system.

In this embodiment, the common signaling parameter generator circuit 913 may include a system information parameter determination circuit 915, a system information generator circuit 917, a common signaling encoder circuit 919, the like, or any combination thereof. The system information parameter determination circuit 915 may be configured to determine a value for the parameter that indicates the one or more frequency resources in which the first wireless communication system operates. The system information generator circuit 917 may be configured to generate system information for the first wireless communication system. The system information may include the parameter. The common signaling encoder circuit 919 may be configured to encode the system information to obtain the common signaling for the first wireless communication system.

Figure 10:
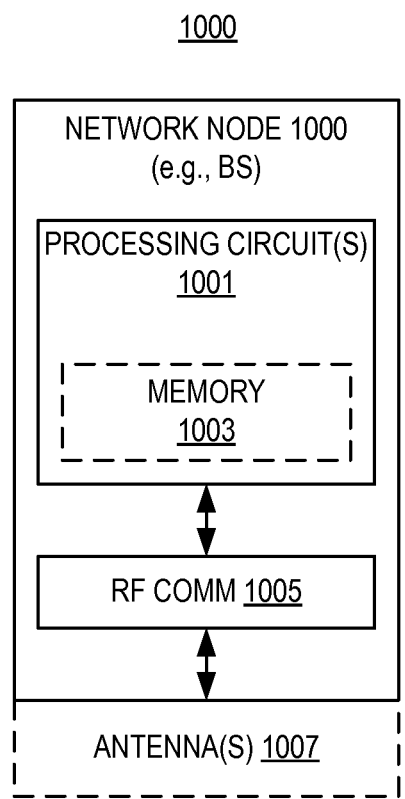
FIG. 10 illustrates another embodiment of a network node for determining a frequency resource for a wireless device to operate in a wireless communication system in accordance with various aspects as described herein.

FIG. 10 illustrates another embodiment of a network node 1000 for determining a frequency resource for a wireless device to operate in a wireless communication system in accordance with various aspects as described herein. In FIG. 10, the network node 1000 (e.g., base station) may include processing circuit(s) 1001, radio frequency (RF) communications circuit(s) 1005, antenna(s) 1007, the like, or any combination thereof. The communication circuit(s) 1005 may be configured to transmit or receive information to or from one or more network nodes or one or more wireless devices via any communication technology. This communication may occur using the one or more antennas 1007 that are either internal or external to the wireless device 1000. The processing circuit(s) 1001 may be configured to perform processing as described herein (e.g., the method of FIGS. 12,15, and 18-19) such as by executing program instructions stored in memory 1003. The processing circuit(s) 1001 in this regard may implement certain functional means, units, or modules.

Figure 11A:
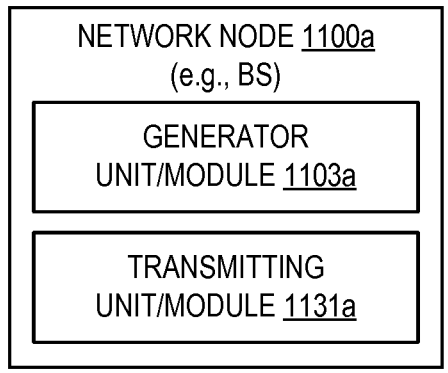
FIGS. 11A-B illustrate other embodiments of a network node for determining a frequency resource for a wireless device to operate in a wireless communication system in accordance with various aspects as described herein.
Figure 11B:
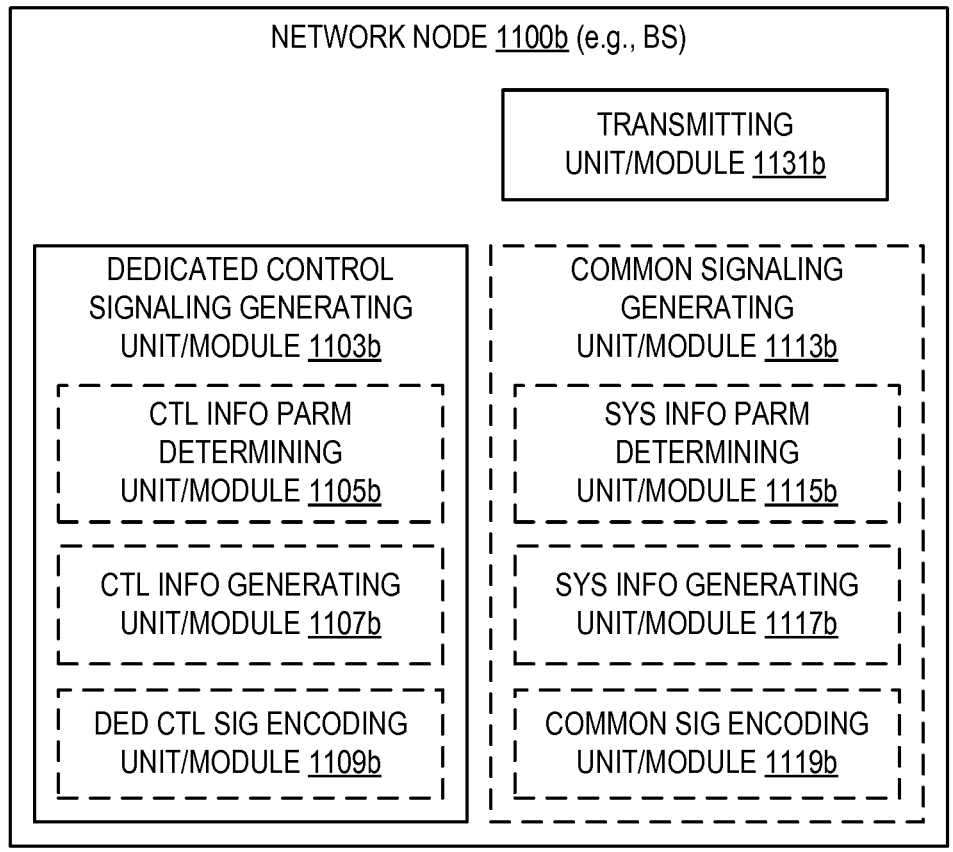

FIGS. 11A-B illustrate other embodiments of a network node 1100*a,b* for determining a frequency resource for a wireless device to operate in a wireless communication system in accordance with various aspects as described herein. In FIG. 11A, the wireless device 1100*a* may implement various functional means, units, or modules (e.g., via the processing circuit(s) 1001 in FIG. 10 or via software code). These functional means, units, or modules (e.g., for implementing the method of FIGS. 12, 15, and 18-19) may include a generating module or unit 1103*a* for generating dedicated control signaling and common signaling for a wireless device in the first wireless communication system. Each of the dedicated control signaling and the common signaling may include a parameter. The parameter may be transmitted to the wireless device via the dedicated control signaling or the common signaling to indicate to the wireless device to configure itself to operate on a frequency resource whose location is defined based on the parameter received via the dedicated control signaling (even if such wireless device also receives the same parameter via the common signaling) or the common signaling. These functional means, units, or modules may also include a transmitting module or unit 1131*a* for transmitting the dedicated control signaling or the common signaling to the wireless device in the first wireless communication system.

In FIG. 11B, the wireless device 1100*b* may implement various functional means, units, or modules (e.g., via the processing circuit(s) 1001 in FIG. 10 or via software code). These functional means, units, or modules (e.g., for implementing the method of FIGS. 12, 15, and 18-19) may include a dedicated control signaling generating module or unit 1103*b* for generating dedicated control signaling for a wireless device in the first wireless communication system. The dedicated control signaling may include a parameter. The parameter may be transmitted to the wireless device via the dedicated control signaling to indicate to the wireless device to configure itself to operate on a frequency resource whose location is defined based on the parameter received via the dedicated control signaling (even if such wireless device also receives the same parameter via the common signaling). These functional means, units, or modules may include a common signaling generating module or unit 1113b for generating common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. These functional means, units, or modules may also include a transmitting module or unit 1131a for transmitting the dedicated control signaling or the common signaling to the wireless device in the first wireless communication system.

In this embodiment, the dedicated control signaling generating module or unit 1103b may include a control information parameter determining module or unit 1105b, a control information generating module or unit 1107b, a dedicated control signaling encoding module or unit 1109b, the like, or any combination thereof. The control information parameter determining module or unit 1105b may include determining a value for the parameter that indicates the one or more frequency resources in which the first wireless communication system operates. The control information generating module or unit 1107b may include generating system information for the first wireless communication system. The system information may include the parameter. The dedicated control signaling encoding module or unit 1109b may include encoding the system information to obtain the common signaling for the first wireless communication system.

In FIG. 11B, the common signaling parameter generating module or unit 1113b may include a system information parameter determining module or unit 1115b, a system information generating module or unit 1117b, a common signaling encoding module or unit 1119b, the like, or any combination thereof. The system information parameter determining module or unit 1115b may include determining a value for the parameter that indicates the one or more frequency resources in which the first wireless communication system operates. The system information generating module or unit 1117b may be configured to generate system information for the first wireless communication system. The system information may include the parameter. The common signaling encoding module or unit 1119b may be configured to encode the system information to obtain the common signaling for the first wireless communication system.

FIG. 12 illustrates one embodiment of a method 1200 by a network node for determining a frequency resource for a wireless device to operate in a wireless communication system in accordance with various aspects as described herein. In FIG. 12, the method 1200 may start, for instance, at block 1201, where it may include generating dedicated control signaling for a wireless device in a first wireless communication system. The dedicated control signaling may include a parameter. Further, the parameter may be transmitted to the wireless device via the dedicated control signaling to indicate to the wireless device to configure itself to operate on a frequency resource whose location is defined based on the parameter received via the dedicated control signaling (even if such wireless device also receives the same parameter via the common signaling). At block 1203, the method 1200 may include transmitting the dedicated control signaling to the wireless device in the first wireless communication system. At block 1205, the method 1200 may include generating common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. At block 1207, the method 1200 may include transmitting the common signaling to the wireless device in the first wireless communication system.

Figure 18:
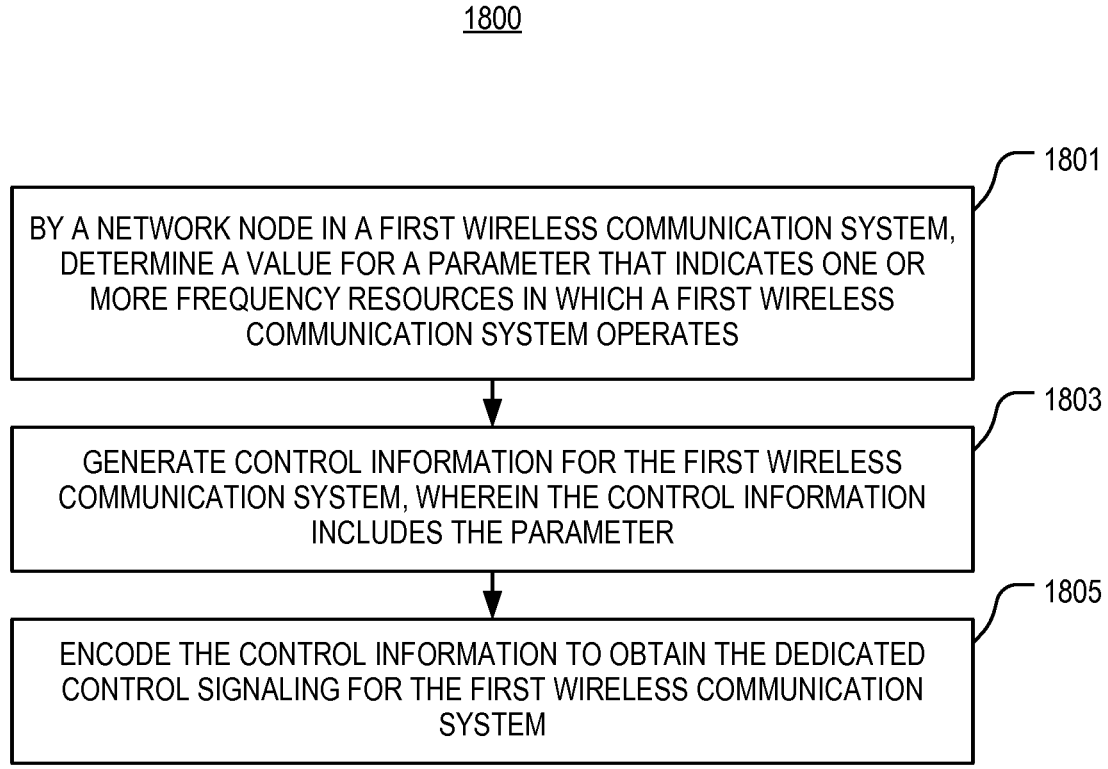
FIG. 18 illustrates one embodiment of a method by a wireless device for generating dedicated control signaling for a wireless device in a first wireless communication system in accordance with various aspects as described herein.

FIG. 18 illustrates one embodiment of a method 1800 by a wireless device for generating dedicated control signaling for a wireless device in a first wireless communication system in accordance with various aspects as described herein. In FIG. 18, the method 1800 may start, for instance, at block 1801 where it may include determining a value for a parameter that indicates one or more frequency resources in which a first wireless communication system operates. At block 1803, the method 1800 may include generating control information for the first wireless communication system. Further, the control information may include the parameter. At block 1805, the method may include encoding the control information to obtain the dedicated control signaling for the first wireless communication system.

Figure 19:
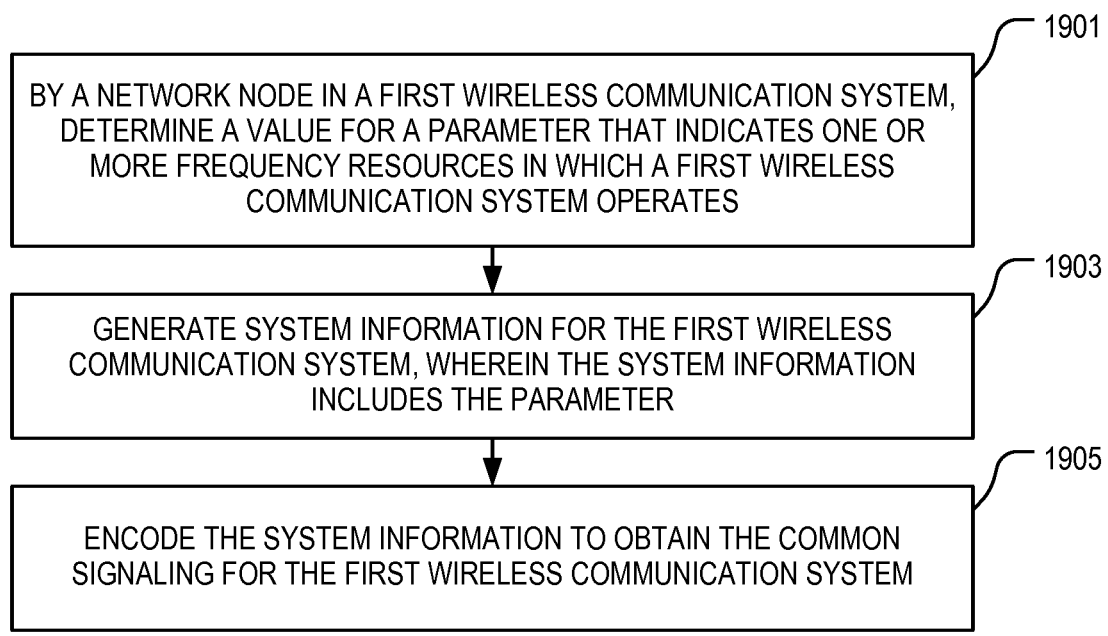
FIG. 19 illustrates one embodiment of a method by a wireless device for generating common signaling for a wireless device in a first wireless communication system in accordance with various aspects as described herein.

FIG. 19 illustrates one embodiment of a method 1900 by a wireless device for generating common signaling for a wireless device in a first wireless communication system in accordance with various aspects as described herein. In FIG. 19, the method 1900 may start, for instance, at block 1901 where it may include determining a value for a parameter that indicates one or more frequency resources in which a first wireless communication system operates. At block 1903, the method 1900 may include generating system information for the first wireless communication system. The system information may include the parameter. At block 1905, the method 1900 may include encoding the system information to obtain the common signaling for the first wireless communication system.

Of course, despite particular applicability to NB-IoT in some examples, it will be appreciated that the techniques may be applied to other wireless networks, including enhanced machine type communications (eMTC) as well as to successors of the evolved universal terrestrial radio access network (E-UTRAN). Thus, references herein to signals using terminology from the 3GPP standards for LTE should be understood to apply more generally to signals having similar characteristics and/or purposes, in other networks.

A radio node herein is any type of node (e.g., a network node or wireless device) capable of communicating with another node over radio signals. A radio network node is any type of radio node within a wireless communication network, such as a base station. A wireless device is any type of radio node capable of communicating with a radio network node over radio signals. A wireless device may therefore refer to a machine-to-machine (M2M) device, a machine-type communications (MTC) device, a NB-IoT device, etc. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

Furthermore, in an NB-IoT context, it may be the case that, to support lower manufacturing costs for NB-IOT devices, the transmission bandwidth is reduced to one physical resource block (PRB) of size 180 KHz. Both frequency division duplexing (FDD) and TDD are supported. For FDD (i.e. the transmitter and receiver operate at different carrier frequencies) only half-duplex mode needs to be supported in the UE. The lower complexity of the devices (e.g. only one transmission/receiver chain) means that a small number of repetitions might be needed also in normal coverage. Further, to alleviate UE complexity, the working assumption may be to have cross-subframe scheduling. That is, a transmission is first scheduled on Enhanced Physical Downlink Control Channel (E-PDCCH aka M-EPDCCH) and then the first transmission of the actual data on the Physical Downlink Shared Channel (PDSCH) is carried out after the final transmission of the M-EPDCCH.

Figure 13:
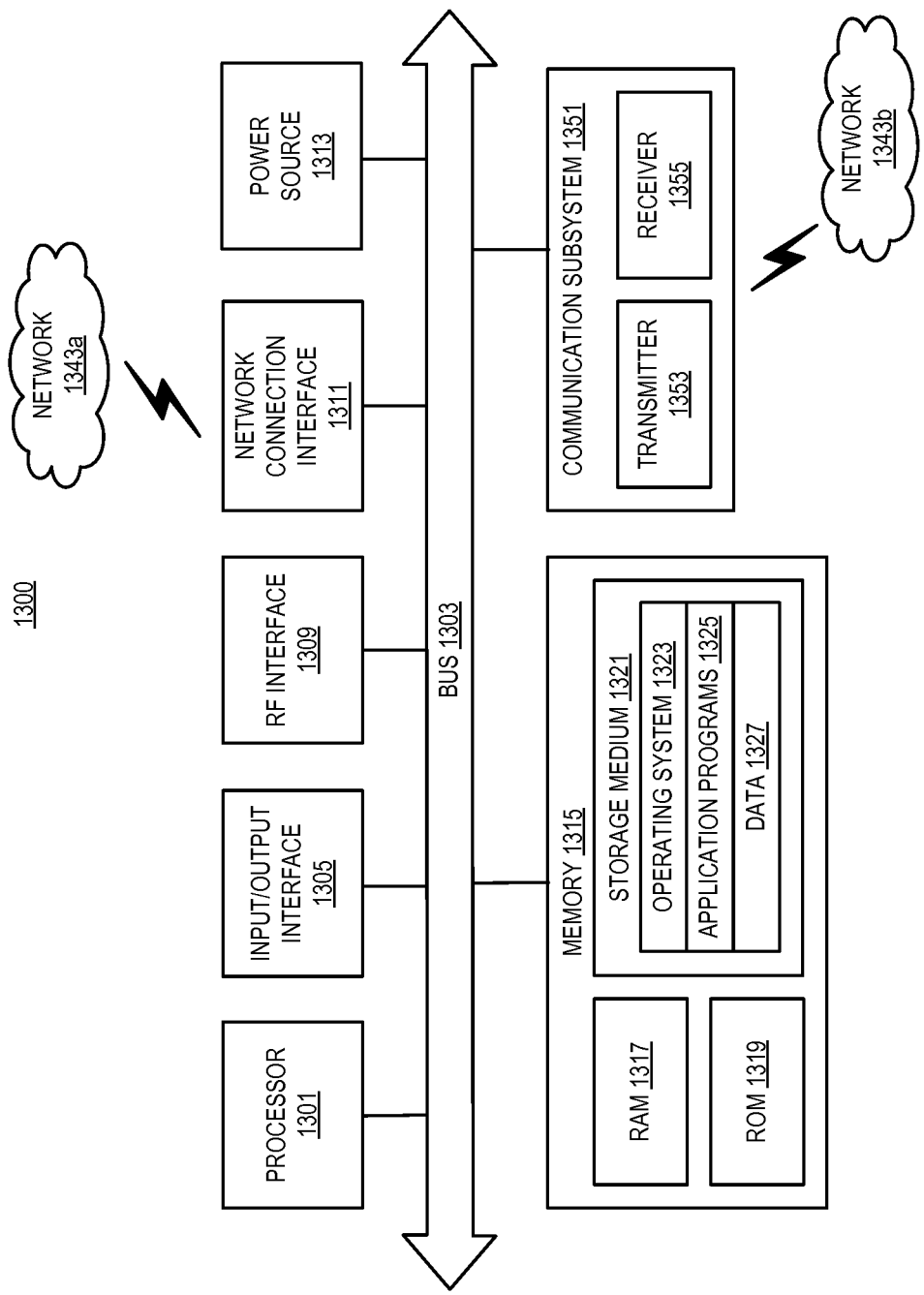
FIG. 13 illustrates another embodiment of a wireless device in accordance with various aspects as described herein.

FIG. 13 illustrates another embodiment of a wireless device 1300 in accordance with various aspects as described herein. In some instances, the wireless device 1300 may be referred as a user equipment (UE), a mobile station (MS), a terminal, a cellular phone, a cellular handset, an M2M device, an MTC device, an NB-IOT device, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 1300 may be a set of hardware components. In FIG. 13, the wireless device 1300 may be configured to include a processor 1301 that is operatively coupled to an input/output interface 1305, a radio frequency (RF) interface 1309, a network connection interface 1311, a memory 1315 including a random access memory (RAM) 1317, a read only memory (ROM) 1319, a storage medium 1321 or the like, a communication subsystem 1351, a power source 1313, another component, or any combination thereof. The storage medium 1321 may include an operating system 1323, an application program 1325, data 1327, or the like. Specific devices may utilize all of the components shown in FIG. 13, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 13, the processor 1301 may be configured to process computer instructions and data. The processor 1301 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1301 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1305 may be configured to provide a communication interface to an input device, output device, or input and output device. The wireless device 1300 may be configured to use an output device via the input/output interface 1305. A person of ordinary skill will recognize that an output device may use the same type of interface port as an input device. For example, a USB port may be used to provide input to and output from the wireless device 1300. The output device may be a speaker, a sound card, a video card, a display, a monitor, a printer, an actuator, an emitter, a smartcard, another output device, or any combination thereof. The wireless device 1300 may be configured to use an input device via the input/output interface 1305 to allow a user to capture information into the wireless device 1300. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, the RF interface 1309 may be configured to provide a communication interface to RF components such as a transmitter, a receiver, and an antenna. The network connection interface 1311 may be configured to provide a communication interface to a network 1343*a*. The network 1343*a* may encompass wired and wireless communication networks such as a local-area network (LAN), a wide-area network (WAN), a computer network, a wireless network, a telecommunications network, another like network or any combination thereof. For example, the network 1343*a* may be a Wi-Fi network. The network connection interface 1311 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1311 may implement receiver and transmitter functionality appropriate to the communication network links (e.g., optical, electrical, and the like). The transmitter and receiver functions may share circuit components, software, or firmware, or alternatively may be implemented separately.

In this embodiment, the RAM 1317 may be configured to interface via the bus 1302 to the processor 1301 to provide storage or caching of data or computer instructions during the execution of software programs such as the operating system, application programs, and device drivers. In one example, the wireless device 1300 may include at least one hundred and twenty-eight megabytes (128 Mbytes) of RAM. The ROM 1319 may be configured to provide computer instructions or data to the processor 1301. For example, the ROM 1319 may be configured to be invariant low-level system code or data for basic system functions such as basic input and output (I/O), startup, or reception of keystrokes from a keyboard that are stored in a non-volatile memory. The storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1321 may be configured to include an operating system 1323, an application program 1325 such as a web browser application, a widget or gadget engine or another application, and a data file 1327.

In FIG. 13, the processor 1301 may be configured to communicate with a network 1343b using the communication subsystem 1351. The network 1343a and the network 1343b may be the same network or networks or different network or networks. The communication subsystem 1351 may be configured to include one or more transceivers used to communicate with the network 1343b. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMax, or the like.

In another example, the communication subsystem 1351 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMax, NB-IoT, or the like. Each transceiver may include a transmitter 1353 or a receiver 1355 to implement transmitter or receiver functionality, respectively, appropriate to the RAN links (e.g., frequency allocations and the like). Further, the transmitter 1353 and the receiver 1355 of each transceiver may share circuit components, software, or firmware, or alternatively may be implemented separately.

In the current embodiment, the communication functions of the communication subsystem 1351 may include data communication, voice communication, multimedia communication, short-range communications such as Bluetooth, near-field communication (NFC), location-based communication such as the use of the global positioning system (GPS) to determine a location, another like communication function, or any combination thereof. For example, the communication subsystem 1351 may include cellular communication, Wi-Fi communication, Bluetooth communication, and GPS communication. The network 1343b may encompass wired and wireless communication networks such as a local-area network (LAN), a wide-area network (WAN), a computer network, a wireless network, a telecommunications network, another like network or any combination thereof. For example, the network 1343b may be a cellular network, a Wi-Fi network, and a near-field network. The power source 1313 may be configured to provide an alternating current (AC) or direct current (DC) power to components of the wireless device 1300.

In FIG. 13, the storage medium 1321 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1321 may allow the wireless device 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a computer-readable medium.

The functionality of the methods described herein may be implemented in one of the components of the wireless device 1300 or partitioned across multiple components of the wireless device 1300. Further, the functionality of the methods described herein may be implemented in any combination of hardware, software, or firmware. In one example, the communication subsystem 1351 may be configured to include any of the components described herein. Further, the processor 1301 may be configured to communicate with any of such components over the bus 1302. In another example, any of such components may be represented by program instructions stored in memory that when executed by the processor 1301 performs the corresponding functions described herein. In another example, the functionality of any of such components may be partitioned between the processor 1301 and the communication subsystem 1351. In another example, the non-computative-intensive functions of any of such components may be implemented in software or firmware and the computative-intensive functions may be implemented in hardware.

This disclosure includes describing a flexible means to configure the in-band parameters in a radio resource control (RRC) message or in a new system information block (SIB) depending on what is optimal for the current network (e.g., the expected number of UEs to be reconfigured). Further, this disclosure includes describing alternatives for configuring UEs to use non-anchor physical resource blocks (PRBs). For instance, for a few UEs, it is more optimal to use dedicated control signaling (e.g., RRC message). However, for many UEs, it is more optimal to use common signaling (e.g., in-band parameters over system information).

An abstract syntax notation one (ASN.1) is an interface description language for defining data structures that may be serialized/de-serialized in a standard, cross-platform way.

The ASN.1 format notation is used herein to show how the in-band parameters are communicated to the UE in a flexible way. These parameters may be included in the re-configuration RRC message (e.g., transmitted as part of the RRC Connection Setup procedure, the RRC Connection Resume procedure or the RRC Connection Reconfiguration procedure) or in a system information block (SIB) broadcasted on the anchor carrier. In general, information that applies to all UEs is beneficial to have broadcasted as system information (SI). However, if only relatively few UEs are redirected, then sending a parameter in the RRC message would be beneficial. In this disclosure, UEs will read the configuration from the SI. However, if the same parameter is provided in the RRC message, then upon re-configuration the parameter in the RRC message will override the same parameter in the SI.

Figure 14:
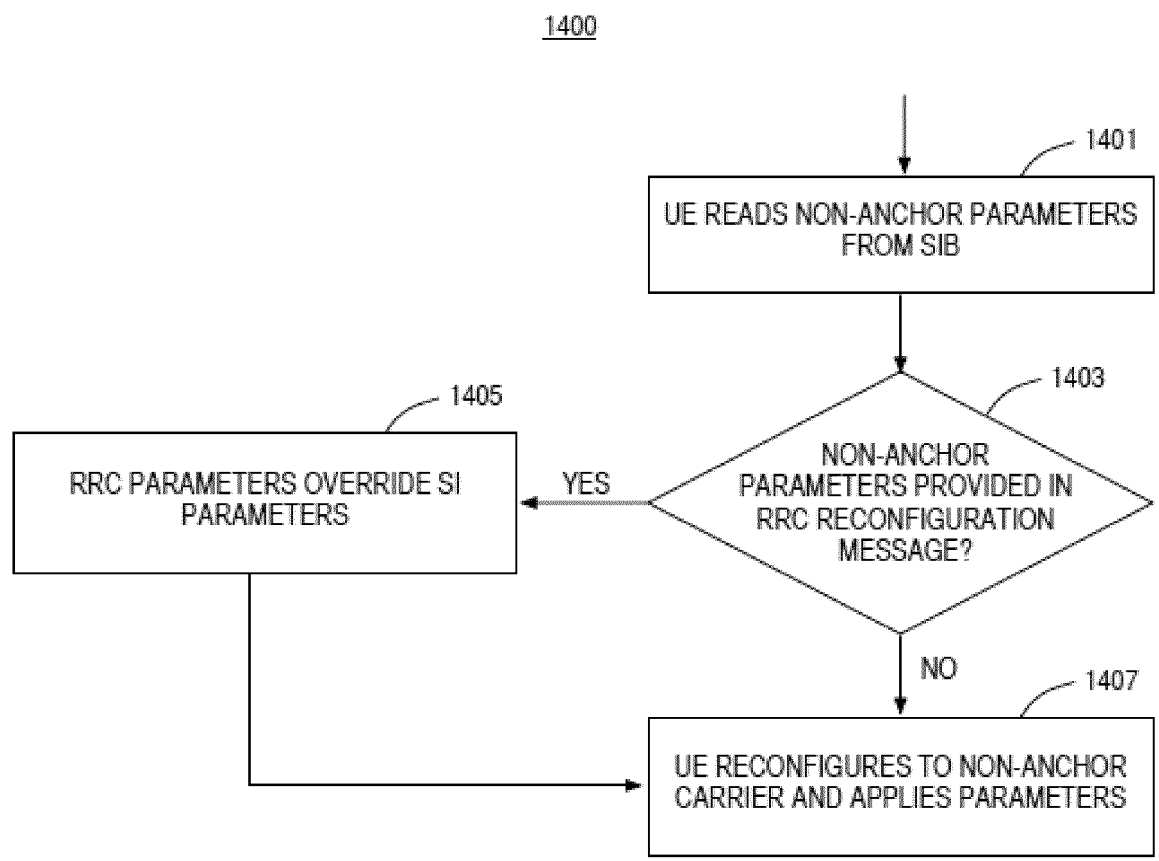
FIG. 14 illustrates another embodiment of a method by a wireless device for determining a frequency resource for which to operate in a wireless communication system in accordance with various aspects as described herein.

FIG. 14 illustrates another embodiment of a method 1400 by a wireless device for determining a frequency resource for which to operate in a wireless communication system in accordance with various aspects as described herein. In FIG. 14, the method 1400 may include reading non-anchor parameters in the SIB. At block 1403, the method 1400 may include determining whether the same non-anchor parameters are provided in an RRC reconfiguration message. If so, then the method 1400 determines that the non-anchor parameters in the RRC reconfiguration message override the same parameters in the SIB, as referenced at block 1405. At block 1407, the method 1400 reconfigures the UE to the non-anchor carrier and applies the parameters.

Figure 15:
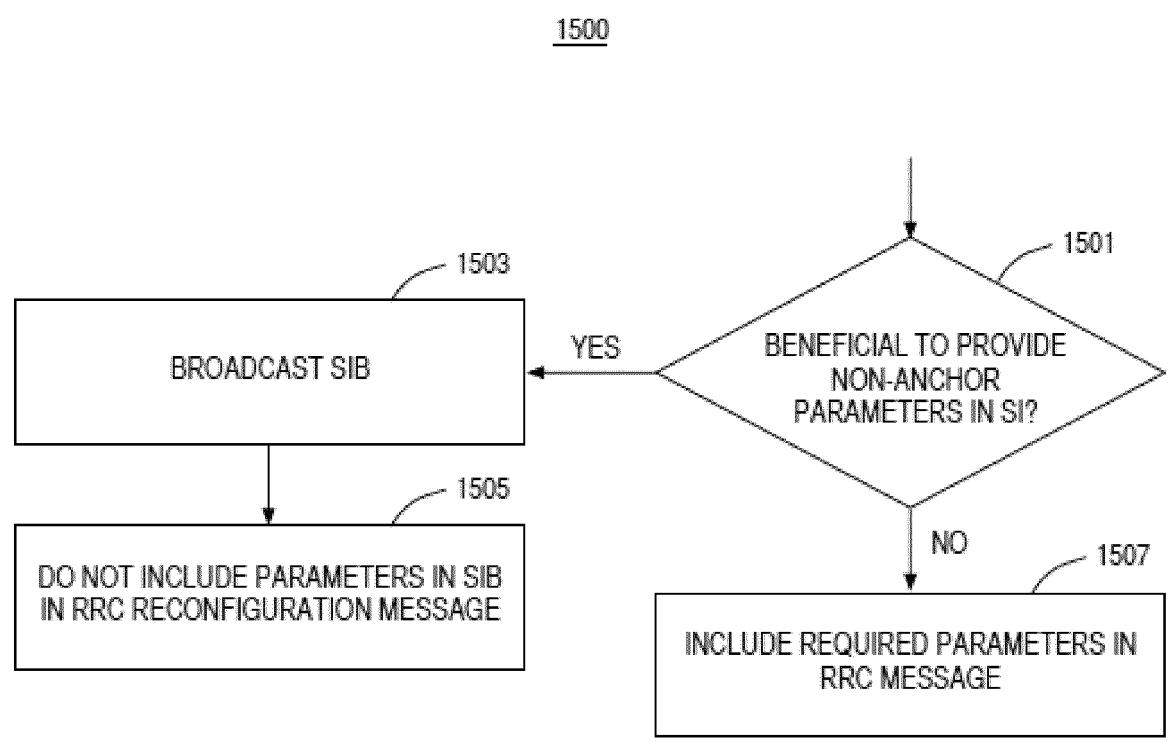
FIG. 15 illustrates another embodiment of a method by a network node for determining a frequency resource for a wireless device to operate in a wireless communication system in accordance with various aspects as described herein.

FIG. 15 illustrates another embodiment of a method 1500 by a network node for determining a frequency resource for a wireless device to operate in a wireless communication system in accordance with various aspects as described herein. In FIG. 15, the method 1500 may start, for instance, at block 1501 where it may include determining whether it is beneficial to provide non-anchor parameters in the SIB. If so, then at block 1503, the method 1500 may include broadcasting the non-anchor parameters in the SIB. Further, the method 1500 may include determining not to send the non-anchor parameters in an RRC reconfiguration message, as referenced at block 1505. If it is determined not to be beneficial to provide the non-anchor parameters in the SIB, then the method 1900 may include sending the non-anchor parameters in an RRC reconfiguration message, as referenced at block 1507.

The condition to determine whether it is optimal to broadcast parameters in SI (multicast) or in RRC message (unicast) may be a function of several factors such as:

frequency of UEs re-configured to other (non-anchor) carriers;

fraction of UEs re-configured to other (non-anchor) carriers;

number of configured NB-IoT carriers in the LTE carrier; or predicted or statistical traffic of NB-IoT UEs in the cell/network.

If more information has to be included for re-configuration to a guard-band non-anchor carrier this disclosure could also apply and be beneficial for that case.

Additional details on a UE reconfiguration to a non-anchor carrier are provided below. NB-IoT carrier reconfiguration details include if the carrierInfo is included and specifies a carrier that the UE shall use for future receptions and transmissions, then the UE shall start to use the new carrier immediately after the last transport block carrying the RRC message has been acknowledged by the MAC layer, and any subsequent RRC response message sent for the current RRC procedure is therefore sent on the new carrier;

In one embodiment, in physicalConfigDedicated-NB, a NB-IoT UE is optionally provided with a set of parameters related to the non-anchor carrier(s). The set of parameters are scenario-dependent (e.g., from/to in-band/guard-band/standalone) and relate to downlink and/or uplink non-anchor carriers, as described below in the ASN.1 structure.

```
-- ASN1START
Carrier-ConfigDedicated-NB-r13 ::=    SEQUENCE {
    dl-nonAnchorCarrierFreq-NB-r13    DL-NonAnchorCarrierFreq-NB-r13    OPTIONAL,
    ul-nonAnchorCarrierFreq-NB-r13    UL-NonAnchorCarrierFreq-NB-r13    OPTIONAL
}
-- ASN1STOP
```

Hence, Carrier-ConfigDedicated-NB-r13 with the preceding ASN.1 format is introduced in physicalConfigDedicated-NB to specify the uplink and/or downlink non-anchor carrier(s) structure:

In another embodiment, the actual NB-IoT channel center frequency in the case of in-band/guard-band operations will have a frequency offset to the 100 kHz raster ranging from 2.5 kHz to 47.5 kHz. Hence, in order to be able to configure the UE to a non-anchor carrier, the carrier frequency information is conveyed in terms of Evolved-UTRA absolute radio frequency channel number (eARFCN) and an optional offset needed for guard-band/in-band operation, described as follows in ASN.1 format. Evolved-UTRA is the acronym for Evolved UMTS Terrestrial Radio Access and UMTS is the acronym for Universal Mobile Telecommunications System.

```
-- ASN1START
CarrierFreq-NB-r13 ::=    SEQUENCE {
    carrierFreq-NB-r13         ARFCN-ValueEUTRA-r9,
    carrierFreqOffset-NB-r13   INTEGER (0..19)    OPTIONAL -- Need ON
}
-- ASN1STOP
```

Hence, the non-anchor carrier frequency is configured in terms of eARFCN and an optional offset needed for guard-band/in-band operation according to this ASN.1 format.

In another embodiment, the UE is not expected to receive NPBCH, and NPSS/NSSS and any transmissions other than unicast transmissions in the non-anchor PRB. As a result, the primary cell indentification (PCI) of the non-anchor carriers needs to be communicated to the UEs by either SI broadcast in the anchor carrier or through reconfiguration signaling unless the same PCI is used for the non-anchor carrier as for the anchor carrier. Hence, the PCI of a non-anchor NB-IoT carrier is always the same as its associated anchor carrier.

In another embodiment, for carrier reconfiguration to a downlink non-anchor in-band PRB, apart from the carrier information mentioned above, the number of LTE CRS antenna ports, number of LTE PDCCH symbols (or NB-IoT start symbol), the PRB offset to LTE middle PRB and the knowledge about whether LTE uses same PCI as NB-IoT (in able to be able to use LTE CRS), and number of NRS antenna ports need to be known by the UE prior to the reconfiguration procedure. For carrier reconfiguration to a downlink non-anchor PRB, the number of NB-RS antenna ports needs to be known by the UE during the reconfiguration procedure. These configuration parameters may either be broadcasted on the anchor carrier in a newly defined SIB or optionally sent to the UE in dedicated message in case not broadcasted. Further, on PRBs different than the NB-IoT carrier on which the UE has received NB-PSS/SSS, NB-PBCH and SIB transmissions, the NB-IoT UE may not rate match around NB-PBCH and NB-PSS/SSS (i.e., the mapping of NB-PDCCH/PDSCH symbols to REs occurs without consideration of NB-PSS/SSS/PBCH). However, just including an indication that the carrier which the UE is reconfigured to, does in fact contain NPSS/NSSS and NPBCH would allow for reconfiguring and distributing UEs between several anchor carriers. Since the benefits may be rather large for a minor cost such an indication is included here. The configurations mentioned above are outlined in ASN.1 format below.

```
-- ASN1START
DL-NonAnchorCarrierFreq-NB-r13 ::=    SEQUENCE {
    carrierFreq-NB-r13              CarrierFreq-NB-r13,
    nbRsPortsCount-NB-r13           ENUMERATED {n1, n2}    OPTIONAL,    -- Need ON
    servesAsAnchorForOthers         BOOLEAN                OPTIONAL,    -- Need ON
    inbandNonAnchorCarrierInfo      InbandNonAnchorCarrierInfo          OPTIONAL, -- Cond
SIconfig
    ...
}
-- ASN1STOP
```
, where:

```
-- ASN1START
InbandNonAnchorCarrierInfo ::=    SEQUENCE {
    offsetToLteMiddlePrb-NB-r13     INTEGER (-50..49)                    OPTIONAL, --
Cond samePCI
    startSymbol-NB-r13              INTEGER (1..4)         OPTIONAL,
    sameLtePCI-Indicator-NB-r13     BOOLEAN                OPTIONAL,
    lteCrsPortsCount-NB-r13         ENUMERATED {an1, an2, an4, spare1}   OPTIONAL
}
-- ASN1STOP
```

Hence, for NB-IoT downlink non-anchor carrier configuration, the information outlined in this ASN.1 is provided to the UE in physicalConfigDedicated-NB. There may not be a need to include the bandwidth of the LTE carrier but it is sufficient to indicate the offset, which in this case is relative to the central frequency of the LTE carrier.

In another embodiment, for carrier reconfiguration to an uplink non-anchor carrier, the UE needs to know the uplink carrier information. This information may either be explicitly configured via CarrierFreq-NB-r13 mentioned above or alternately in case downlink PRB non-anchor is also configured, the same duplex distance as for anchor downlink-uplink may be indicated to the UE. Furthermore, the UE needs to know whether the target uplink PRB serves as an anchor carrier for other UEs (i.e., whether the non-anchor is used for random access by others). For simplicity, the same random access configuration shall in such case apply to the target PRB as in source PRB. These configurations are outlined in the ASN.1 format below.

```
-- ASN1START
UL-NonAnchorCarrierFreq-NB-r13 :: =    SEQUENCE {
    ulFreqInfo         CHOICE {
        carrierFreq-NB-r13              CarrierFreq-NB-r13,
        sameDuplexDistanceAsAnchor      NULL      -- Cond
    },
```

| | | |
|---|---|---|
| servesAsAnchorForOthers | BOOLEAN | OPTIONAL, -- Need ON |

}
-- ASN1STOP

Hence, for NB-IoT uplink non-anchor carrier configuration, the information outlined in this ASN.1 is provided to the UE.

In another embodiment, in case the parameter "servesAsAnAnchorForOthers" is set to "true" in the configuration to non-anchor carrier above for uplink and/or downlink, the UE shall assume the same available subframes as in its anchor carrier.

In another embodiment, as mentioned above, another way to convey many of the parameters above related to non-anchor carrier is through system information on the anchor carrier. This could be beneficial in case an operator often configures UEs to non-anchor carriers with same configuration rather than repeatedly sending the same configuration parameters to different UEs. Hence, it is suggested to define a new SIB that is optionally broadcasted and contains non-anchor configuration parameters. However, in case configuration parameters are provided in physicalConfigDedicated-NB, they override the parameters broadcasted in anchor carrier.

In another embodiment, in the anchor carrier, it is possible to optionally broadcast NB-IoT downlink/uplink non-anchor carrier configuration.

In another embodiment, parameters provided to the UE in physicalConfigDedicated-NB override the non-anchor configuration parameters broadcasted in anchor carrier.

The following provides a summary of the embodiments described by the ASN.1 structures discussed above.

```
-- ASN1START
PhysicalConfigDedicated-NB ::= SEQUENCE {
    Carrier-ConfigDedicated-NB-r13       Carrier-ConfigDedicated-NB-r13
        OPTIONAL,            -- Need ON
    pdsch-ConfigDedicated-NB-r13    PDSCH-ConfigDedicated-NB-r13    OPTIONAL, -- Need ON
    pusch-ConfigDedicated-NB-r13    PUSCH-ConfigDedicated-NB-r13    OPTIONAL, -- Need ON
    uplinkPowerControlDedicated-NB-r13 UplinkPowerControlDedicated-NB-r13
        OPTIONAL,            -- Need ON
    tpc-PDCCH-ConfigPUSCH           TPC-PDCCH-Config                OPTIONAL, -- Need ON
    cqi-ReportConfig-NB-r13         CQI-ReportConfig-NB-r13
        OPTIONAL,            -- Need ON
    soundingRS-UL-ConfigDedicated-NB-r13  SoundingRS-UL-ConfigDedicated-NB-r13
        OPTIONAL,            -- Need ON
    ...
}
-- ASN1STOP
```

| physicalConfigDedicated-NB field descriptions |
|---|
| Carrier-ConfigDedicated-NB-r13<br>This parameter contains the non-anchor carrier frequency positions dl-nonAnchorCarrierFreq-NB-r13 and/or ul-nonAnchorCarrierFreq-NB-r13. |

The following structure has been proposed for Carrier-ConfigDedicated-NB-r13:

```
-- ASN1START
Carrier-ConfigDedicated-NB-r13 :: =  SEQUENCE {
    dl-nonAnchorCarrierFreq-NB-r13    DL-NonAnchorCarrierFreq-NB-r13
        OPTIONAL,
    ul-nonAnchorCarrierFreq-NB-r13    UL-NonAnchorCarrierFreq-NB-r13    OPTIONAL
}
-- ASN1STOP
```

| Carrier-ConfigDedicated-NB-r13 field descriptions |
|---| dl-nonAnchorCarrierFreq-NB-r13
This parameter specifies the frequency for the downlink carrier plus some additional information. If this parameter as absent the UE shall continue to use the anchor downlink carrier.
ul-nonAnchorCarrierFreq-NB-r13
This parameter specifies the frequency for the uplink carrier plus some additional information. If this parameter as absent the UE shall continue to use the anchor uplink carrier.

```
-- ASN1START
DL-NonAnchorCarrierFreq-NB-r13 ::=   SEQUENCE {
    carrierFreq-NB-r13              CarrierFreq-NB-r13,
    nbRsPortsCount-NB-r13           ENUMERATED {n1, n2}    OPTIONAL,    -- Need ON
    servesAsAnchorForOthers         BOOLEAN                OPTIONAL,    -- Need ON
    inbandNonAnchorCarrierInfo      InbandNonAnchorCarrierInfo          OPTIONAL, -- Cond SIconfig
    ...
}
-- ASN1STOP
```

| DL-NonAnchorCarrierFreq-NB-r13 field descriptions |
|---| nbRsPortsCount-NB-r13
This parameter specifies whether the eNB uses one antenna port (n1) or two (n2). If this parameter is not present, the UE shall assume the same number of antenna ports as configured for the anchor carrier.
servesAsAnchorForOthers
If this parameter is set to True the non-anchor carrier contains NPSS/NSSS, NPBCH and System Information.
inbandNonAnchorCarrierInfo
This parameter gives the configuration for the downlink non-anchor carrier. This configuration will override any previous configured by system information broadcast in the anchor carrier.

| Conditional presence | Explanation |
|---|---|
| SIconfig | The field is mandatory present if the UE is reconfigured to an in-band carrier and InbandNonAnchorCarrierInfo is not provided in SI. Otherwise the field is optional present, and any configuration given will override the corresponding one in SI. |

| InbandNonAnchorCarrierInfo field descriptions |
|---| offsetToLteMiddlePrb-NB-r13
This parameter gives the PRB index relative to the middle PRB in order for the UE to determine the legacy CRS. The sign of the PRB index is positive for PRBs higher in frequency than the central PRB and negative for PRBs lower in frequency. For an LTE carrier with an even number of PRBs the central six PRBs ({−3, 2}) are not valid as NB-IoT non-anchor carriers, and for odd numbers of PRBs the central seven PRBs ({−3, 3}) are not valid.
startSymbol-NB-r13

-continued

| InbandNonAnchorCarrierInfo field descriptions |
|---|

This parameter specifies the PDCCH region of the LTE carrier.
sameLtePCI-Indicator-NB-r13
This parameter specifies whether the non-anchor carrier reuses the same PCI as the LTE carrier.
lteCrsPortsCount-NB-r13
This parameter specifies the number of antenna ports used by the legacy carrier in the in-band case.

| Conditional presence | Explanation |
|---|---|
| samePCI | The field is mandatory present if the sameLtePCI-Indicator-NB-r13 is present and set to TRUE. Otherwise the field is not present. |

```
-- ASN1START
InbandNonAnchorCarrierInfo ::=    SEQUENCE {
    offsetToLteMiddlePrb-NB-r13   INTEGER (-50..49)              OPTIONAL, -- Cond samePCI
    startSymbol-NB-r13            INTEGER (1..4)                 OPTIONAL,
    sameLtePCI-Indicator-NB-r13   BOOLEAN                        OPTIONAL,
    lteCrsPortsCount-NB-r13       ENUMERATED {an1, an2, an4, spare1}   OPTIONAL
}
-- ASN1STOP
```

```
-- ASN1START
UL-NonAnchorCarrierFreq-NB-r13 ::=    SEQUENCE {
    ulFreqInfo         CHOICE {
        carrierFreq-NB-r13              CarrierFreq-NB-r13,
        sameDuplexDistanceAsAnchor      NULL      -- Cond
    },
    servesAsAnchorForOthers            BOOLEAN    OPTIONAL, -- Need ON
    ...
}
-- ASN1STOP
```

| UL-NonAnchorCarrierFreq-NB-r13 field descriptions |
|---|
| ulFreqInfo<br>This parameter specifies whether the frequency for the uplink carrier explicitly included or implicit from reusing the same duplex distance as for the anchor carrier.<br>sameDuplexDistanceAsAnchor<br>If the downlink non-anchor carrier is specified by DL-NonAnchorCarrierFreq-NB-r13, this parameter may be specified to reuse the same duplex distance as for the anchor carrier and hence the uplink carrier frequency is not specified.<br>servesAsAnchorForOthers<br>If this parameter is set to True the non-anchor carrier contains NPSS/NSSS, NPBCH and System Information. |

```
-- ASN1START
CarrierFreq-NB-r13 ::=            SEQUENCE {
    carrierFreq-NB-r13            ARFCN-ValueEUTRA-r9,
    carrierFreqOffset-NB-r13      INTEGER (0..19)    OPTIONAL -- Need ON
}
-- ASN1STOP
```

| CarrierFreq-NB-r13 field descriptions |
|---|
| carrierFreq-NB-r13<br>This parameter specifies the central frequency for the carrier in terms on ARFCN.<br>carrierFreqOffset-NB-r13<br>The frequency offset of the carrier relative to the central frequency is given as ((carrierFreqOffset-NB-r13 - 10) * 2 + 1) * 2.5) kHz for downlink, and ((carrierFreqOffset-NB-r13 - 10) * 2) * 2.5) kHz for uplink. If this optional parameter is omitted the UE shall apply a zero offset according to 'Need ON'. |

In another embodiment, a structure for the system information block containing the information about the LTE carrier in the case the non-anchor carrier is in-band is described in the ASN.1 format below.

SystemInformationBlockTypeX Information Element

```
-- ASN1START
SystemInformationBlockTypeX-r13    ::=   SEQUENCE {
InbandNonAnchorCarrierInfo         ::=   SEQUENCE {
    offsetToLteMiddlePrb-NB-r13          INTEGER (-50..49)                      OPTIONAL, -- Cond samePCI
    startSymbol-NB-r13                   INTEGER (1..4)                         OPTIONAL,
    sameLtePCI-Indicator-NB-r13          BOOLEAN                                OPTIONAL,
    lteCrsPortsCount-NB-r13              ENUMERATED {an1, an2, an4, spare1}     OPTIONAL,
    ...
    }
}
-- ASN1STOP
```

InbandNonAnchorCarrierInfo field descriptions offsetToLteMiddlePrb-NB-r13
This parameter gives the PRB index relative to the middle PRB in order for the UE to determine the legacy CRS. The sign of the PRB index is positive for PRBs higher in frequency than the central PRB and negative for PRBs lower in frequency. For an LTE carrier with an even number of PRBs the central six PRBs ({−3, 2}) are not valid as NB-IoT non-anchor carriers, and for odd numbers of PRBs the central seven PRBs ({−3, 3}) are not valid.
startSymbol-NB-r13
This parameter specifies the PDCCH region of the LTE carrier.
sameLtePCI-Indicator-NB-r13
This parameter specifies whether the non-anchor carrier reuses the same PCI as the LTE carrier.
lteCrsPortsCount-NB-r13
This parameter specifies the number of antenna ports used by the legacy carrier in the in-band case.

| Conditional presence | Explanation |
| --- | --- |
| samePCI | The field is mandatory present if the sameLtePCI-Indicator-NB-r13 is present and set to TRUE. Otherwise the field is not present. |

In one embodiment, a method performed by a wireless device in a first wireless communication system for determining a frequency resource on which to operate includes determining whether a parameter is received via dedicated control signaling in the first wireless communication system. Further, a value of the parameter indicates one or more frequency resources in which the first wireless communication system operates. In response to determining that the parameter is received via the dedicated control signaling in the first wireless communication system, the method includes configuring the wireless device to operate on a frequency resource whose location is defined based on the parameter received via such dedicated control signaling, even if the wireless device also receives the same parameter via common signaling that is transmitted to multiple wireless devices in the first wireless communication system.

In another embodiment, the parameter may indicate that one or more frequency resources within a guard-band or in-band of a second wireless communication system are the one or more frequency resources in which the first communication system is operable.

In another embodiment, the parameter may indicate the one or more frequency resources in which the first communication system is operable relative to one or more frequency resources of a second wireless communication system.

In another embodiment, the parameter may indicate that one or more frequency resources outside both a guard-band and in-band of a second wireless communication system are the one or more frequency resources in which the first communication system is operable.

In another embodiment, the first wireless communication system may be operable in a guard-band or in-band of a second wireless communication system.

In another embodiment, the first wireless communication system may be operable outside both a guard-band and in-band of a second wireless communication system.

In another embodiment, the method may include configuring the wireless device to operate on a frequency resource whose location is indicated by the parameter via the common signaling in the first wireless communication system responsive to determining that the parameter is not received via the dedicated control signaling.

In another embodiment, the method may include receiving, by the wireless device, a signal on a frequency resource on which the first wireless communication system operates, wherein the signal includes the dedicated control signaling having control information. Further, the method may include obtaining the dedicated control signaling from the signal. Also, the method may include decoding the dedicated control signaling to obtain the control information. In addition, the method may include determining whether the parameter is in the control information.

In another embodiment, the method may include determining that the parameter is in the control information.

In another embodiment, the method may include receiving the signal on a frequency resource in a guard-band or the in-band of the second communication system.

In another embodiment, the method may include receiving the signal on a frequency resource outside a guard-band and the in-band of the second communication system.

In another embodiment, the method may include determining whether the parameter is received via the common signaling in the first wireless communication system.

In another embodiment, the method may include receiving, by the wireless device, a signal on a frequency resource on which the first wireless communication system operates. Further, the signal may include the common signaling having system information. The method may also include obtaining the common signaling from the signal and decoding the common signaling to obtain the system information. In addition, the method may include determining whether the parameter is in the system information.

In another embodiment, the dedicated control signaling may be received on a unicast channel and the common signaling is received on a multicast channel.

In another embodiment, the dedicated control signaling may be received on a physical downlink control channel (PDCCH) and the common signaling is received on a physical broadcast channel (PBCH).

In one embodiment, a wireless device for determining a frequency resource on which to operate in a first wireless communication system is configured to determine whether a parameter is received via dedicated control signaling in the first wireless communication system. Further, a value of the parameter indicates one or more frequency resources in which the first wireless communication system operates. In response to determining that the parameter is received via the dedicated control signaling in the first wireless communication system, the wireless device is further configured to operate on a frequency resource whose location is defined based on the parameter received via such dedicated control signaling, even if the wireless device also receives the same parameter via common signaling that is transmitted to multiple wireless devices in the first wireless communication system.

In another embodiment, the wireless device may be configured to configure the wireless device to operate on a frequency resource whose location is indicated by the parameter via the common signaling in the first wireless communication system responsive to determining that the parameter is not received via the dedicated control signaling.

In another embodiment, the wireless device may be configured to receive a signal on a frequency resource on which the first wireless communication system operates. The signal may include the dedicated control signaling having control information. Further, the wireless device may be configured to obtain the dedicated control signaling from the signal. The wireless device may also be configured to decode the dedicated control signaling to obtain the control information. In addition, the wireless device may be configured to determine whether the parameter is in the control information.

In another embodiment, the wireless device may be further configured to determine that the parameter is in the control information.

In another embodiment, the wireless device may be configured to receive the signal on a frequency resource in a guard-band or the in-band of the second communication system.

In another embodiment, the wireless device may be configured to receive the signal on a frequency resource outside a guard-band and the in-band of the second communication system.

In another embodiment, the wireless device may be configured to determine whether the parameter is received via the common signaling in the first wireless communication system.

In another embodiment, the wireless device may be configured to receive a signal on a frequency resource on which the first wireless communication system operates. Further, the signal may include the common signaling having system information. The wireless device may be configured to obtain the common signaling from the signal and decoding the common signaling to obtain the system information. In addition, the wireless device may be configured to determine whether the parameter is in the system information.

In one embodiment, a wireless device for determining a frequency resource on which to operate in a first wireless communication system includes a dedicated control signaling parameter determining module or unit for determining whether a parameter is received via dedicated control signaling in the first wireless communication system. A value of the parameter indicates one or more frequency resources in which the first wireless communication system operates. The wireless device includes a configuring module or unit for configuring the wireless device to operate on a frequency resource whose location is defined based on the parameter received via such dedicated control signaling responsive to determining that the parameter is received via the dedicated control signaling in the first wireless communication system, even if the wireless device also receives the same parameter via common signaling that is transmitted to multiple wireless devices in the first wireless communication system.

In another embodiment, the configuring module or unit may be further configured for configuring the wireless device to operate on a frequency resource whose location is indicated by the parameter via the common signaling in the first wireless communication system responsive to determining that the parameter is not received via the dedicated control signaling.

In another embodiment, the wireless device may include a receiving module or unit for receiving a signal on a frequency resource on which the first wireless communication system operates. The signal may include the dedicated control signaling having control information. Further, the wireless device may be configured to include a dedicated control signaling obtaining module or unit for obtaining the dedicated control signaling from the signal. Also, the wireless device may be configured to include a dedicated control signaling decoding module or unit for decoding the dedicated control signaling to obtain the control information. In addition, the wireless device may be configured to include a dedicated control signaling parameter determining unit for determining whether the parameter is in the control information.

In another embodiment, the wireless device may be further configured to include a dedicated control signaling parameter determining unit for determining that the parameter is in the control information.

In another embodiment, the wireless device may include a receiving module or unit for receiving the signal on a frequency resource in a guard-band or the in-band of the second communication system.

In another embodiment, the wireless device may include a receiving module or unit for receiving the signal on a frequency resource outside a guard-band and the in-band of the second communication system.

In another embodiment, the wireless device may be configured to include a common signaling parameter determining module or unit for determining whether the parameter is received via the common signaling in the first wireless communication system.

In another embodiment, the wireless device may include a receiving module or unit for receiving a signal on a frequency resource on which the first wireless communication system operates. Further, the signal may include the common signaling having system information. The wireless device may be configured to include a common signaling obtaining module or unit for obtaining the common signaling from the signal and decoding the common signaling to obtain the system information. In addition, the wireless device may be configured to include a common signaling parameter determining module or unit for determining whether the parameter is in the system information.

In one embodiment, a computer program comprising instructions which, when executed by at least one processor of a wireless device, causes the wireless device to perform any of the methods or portions thereof described herein.

In another embodiment, a carrier may include the computer program of the wireless device. Further, the carrier is one of an electronic signal, optical signal, radio signal, or computer readable storage medium.

In one embodiment, a method performed by a network node in a first wireless communication system for determining a frequency resource for a wireless device to operate includes generating dedicated control signaling for a wireless device in the first wireless communication system. The dedicated control signaling includes a parameter. The parameter is transmitted to the wireless device via the dedicated control signaling to indicate to the wireless device to configure itself to operate on a frequency resource whose location is defined based on the parameter received via the dedicated control signaling, even if such wireless device also receives the same parameter via the common signaling. Further, the method includes transmitting the dedicated control signaling to the wireless device in the first wireless communication system.

In another embodiment, the parameter may indicate that one or more frequency resources within a guard-band or in-band of a second wireless communication system are the one or more frequency resources in which the first communication system is operable.

In another embodiment, the parameter may indicate that the one or more frequency resources in which the first communication system is operable is relative to one or more frequency resources of a second wireless communication system.

In another embodiment, the parameter may indicate that one or more frequency resources outside both a guard-band and in-band of a second wireless communication system are the one or more frequency resources in which the first communication system is operable.

In another embodiment, the first wireless communication system may be operable in a guard-band or in-band of a second wireless communication system.

In another embodiment, the first wireless communication system may be operable outside both a guard-band and in-band of a second wireless communication system.

In another embodiment, the method may include generating common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. The method may also include transmitting the common signaling to the multiple wireless devices in the first wireless communication system.

In another embodiment, the method may include determining a value for the parameter that indicates the one or more frequency resources in which the first wireless communication system operates. Further, the method may include generating control information for the first wireless communication system. The control information may include the parameter. The method may also include encoding the control information to obtain the dedicated control signaling for the first wireless communication system.

In another embodiment, the method may include determining a value for the parameter that indicates the one or more frequency resources in which the first wireless communication system operates. The method may also include generating system information for the first wireless communication system. The system information may include the parameter. In addition, the method may include encoding the system information to obtain the common signaling for the first wireless communication system.

In another embodiment, the method may include transmitting the dedicated control signaling in a guard-band or the in-band of the second communication system.

In another embodiment, the dedicated control signaling may be transmitted on a unicast channel and the common signaling may be transmitted on a multicast channel.

In another embodiment, the dedicated control signaling may be transmitted on a physical downlink control channel (PDCCH) and the common signaling may be transmitted on a physical broadcast channel (PBCH).

In one embodiment, a network node for determining a frequency resource for a wireless device to operate in a first wireless communication system is configured to generate common signaling for a plurality of wireless devices in the first wireless communication system. The common signaling may include a parameter that indicates to the plurality of wireless devices one or more frequency resources. Further, the common signaling may be transmitted to the plurality of wireless devices in the first wireless communication system. Further, the network node is configured to generate dedicated control signaling for one of the plurality of wireless devices in the first wireless communication system. The dedicated control signaling includes the same parameter. Also, the parameter is transmitted to such wireless device via the dedicated control signaling to indicate to such wireless device to configure itself to operate on a frequency resource whose location is defined based on the parameter received via the dedicated control signaling, even if such wireless device also receives the same parameter via the common signaling.

In another embodiment, the network node may be configured to generate common signaling for multiple wireless devices in the first wireless communication system. The common signaling may include the same parameter that indicates to the multiple wireless devices one or more frequency resources in which the first wireless communication system operates. Further, the common signaling may be transmitted to the multiple wireless devices in the first wireless communication system. The network node may also be configured to transmit the common signaling to the multiple wireless devices in the first wireless communication system.

In another embodiment, the network node may be configured to determine a value for the parameter that indicates the one or more frequency resources in which the first wireless communication system operates. Further, the network node may be configured to generate control information for the first wireless communication system. The control information may include the parameter. The network node may also be configured to encode the control information to obtain the common signaling for the first wireless communication system.

In another embodiment, the network node may be configured to determine a value for the parameter that indicates the one or more frequency resources in which the first wireless communication system operates. Further, the network node may be configured to generate system information for the first wireless communication system. The system information may include the parameter. The network node may also be configured to encode the system information to obtain the common signaling for the first wireless communication system.

In another embodiment, the network node may be configured to transmit the dedicated control signaling in a guard-band or the in-band of the second communication system.

In one embodiment, a network node for determining a frequency resource for a wireless device to operate in a first wireless communication system includes a common signaling generator module or unit for generating common signaling for a plurality of wireless devices in the first wireless communication system. The common signaling includes a parameter that indicates to the plurality of wireless devices one or more frequency resources. The common signaling being transmitted to the plurality of wireless devices in the first wireless communication system. The network node also includes a dedicated control signaling generator module for generating dedicated control signaling for one of the plurality of wireless devices in the first wireless communication system. The dedicated control signaling includes the same parameter. The parameter is transmitted to such wireless device via the dedicated control signaling to indicate to such wireless device to configure itself to operate on a frequency resource whose location is defined based on the parameter received via the dedicated control signaling, even if such wireless device also receives the same parameter via the common signaling.

In another embodiment, the network node may include a common signaling generator module or unit for generating common signaling for multiple wireless devices in the first wireless communication system. The common signaling may include the same parameter that indicates to the multiple wireless devices one or more frequency resources in which the first wireless communication system operates.

Further, the common signaling may be transmitted to the multiple wireless devices in the first wireless communication system. The network node may also be configured to transmit the common signaling to the multiple wireless devices in the first wireless communication system.

In another embodiment, the network node may include a dedicated control signaling parameter determining module or unit for determining a value for the parameter that indicates the one or more frequency resources in which the first wireless communication system operates. Further, the network node may include control information generating module or unit for generating control information for the first wireless communication system. The control information may include the parameter. The network node may also include a dedicated control signaling encoding module or unit for encoding the control information to obtain the dedicated control signaling for the first wireless communication system.

In another embodiment, the network node may include a common signaling parameter determining module or unit for determining a value for the parameter that indicates the one or more frequency resources in which the first wireless communication system operates. Further, the network node may include a system information generating module or unit for generating system information for the first wireless communication system. The system information may include the parameter. The network node may also include a common signaling encoder module or unit for encoding the system information to obtain the common signaling for the first wireless communication system.

In another embodiment, the network node may include a transmitting module or unit for transmitting the dedicated control signaling in a guard-band or the in-band of the second communication system.

In one embodiment, a computer program comprising instructions which, when executed by at least one processor of a network node, causes the network node to perform any of the methods or portions thereof described herein.

In another embodiment, a carrier containing the computer program of the network node is one of an electronic signal, optical signal, radio signal, or computer readable storage medium.

ABBREVIATIONS

| Abbreviation | Explanation |
|---|---|
| 3GPP | 3$^{rd}$ Generation Partnership Project |
| BS | Base Station |
| CP | Cyclic Prefix |
| CRC | Cyclic Redundancy Check |
| CRS | Cell Specific Reference Signal |
| CSI | Channel State Information |
| CSS | Common Search Space |
| DL | Downlink |
| eNB | Evolved Node B (i.e., base station) |
| E-UTRA | Evolved Universal Terrestrial Radio Access |
| E-UTRAN | Evolved Universal Terrestrial Radio Access Network |
| DFT | Discrete Fourier Transform |
| FDD | Frequency Division Duplex |
| IFFT | Inverse Fast Fourier Transform |
| IoT | Internet of Things |
| LTE | Long Term Evolution |
| MBSFN | Multimedia Broadcast Single Frequency Network |
| MIB | Master Information Block |
| MIMO | Multiple Input Multiple Output |
| MSR | Multi-Standard Radio |
| MTC | Machine-Type Communication |

-continued

| Abbreviation | Explanation |
|---|---|
| NB | Narrow-Band |
| NB-IoT | Narrow-Band Internet of Things |
| NB-LTE | Narrow-Band LTE (e.g., 180 KHz bandwidth) |
| NB-PBCH | NB-IoT Physical Broadcast Channel |
| NB-PSS | NB-IoT Primary Synchronization Sequence |
| NB-SSS | NB-IoT Secondary Synchronization Sequence |
| NDLSCH | NB Downlink Shared Channel |
| NPBCH | NB Physical Broadcast Channel |
| NPRACH | NB Physical Random Access Channel |
| NPSS | NB Primary Synchronization Channel |
| NRS | NB Reference Symbols |
| NSSS | NB Secondary Synchronization Signal |
| NW | Network |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PBCH | Physical Broadcast Channel |
| PCI | Primary Cell Identification |
| PDCCH | Physical Data Control Channel |
| PRACH | Physical Random Access Channel |
| PRS | Positioning Reference Signal |
| PRB | Physical Resource Block |
| PSD | Power Spectral Density |
| PSS | Primary Synchronization Sequence |
| PUSCH | Physical Uplink Shared Channel |
| RACH | Random Access Channel |
| RAT | Radio Access Technology |
| RF | Radio Frequency |
| RRC | Radio Resource Control |
| SoC | System-on-a-Chip |
| SC-FDMA | Single-Carrier, Frequency Division Multiple Access |
| SFBC | Space Frequency Block Coding |
| SI | System Information |
| SIB | System Information Block |
| SIM | Subscriber Identity Module or Subscriber Identification Module |
| SNR | Signal to Noise Ratio |
| SRS | Sounding Reference Signal |
| SSS | Secondary Synchronization Sequence |
| TDD | Time Division Duplex |
| Tx | Transmitter |
| UE | User Equipment |
| UL | Uplink |
| USS | UE-specific Search Space |
| WB-LTE | Wideband LTE (i.e., corresponds to legacy LTE) |
| ZC | Zadoff-Chu algorithm |

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, performed by a wireless device in a first wireless communication system, for determining a frequency resource on which to operate, the method comprising:
    determining whether a parameter is received via dedicated control signaling in the first wireless communication system, wherein a value of the parameter indicates one or more frequency resources in which the first wireless communication system operates, wherein determining whether the parameter is received via the dedicated control signaling in the first wireless communication system comprises:
        receiving, by the wireless device, a signal on a first frequency resource on which the first wireless communication system operates, wherein the signal includes the dedicated control signaling having control information;
        obtaining the dedicated control signaling from the signal;
        decoding the dedicated control signaling to obtain the control information;
    and
        determining whether the parameter is in the control information; and
    responsive to determining that the parameter is received via the dedicated control signaling in the first wireless communication system, configuring the wireless device to operate on a second frequency resource whose location is defined based on the parameter received via the dedicated control signaling.

2. The method of claim 1, wherein the parameter indicates that one or more frequency resources within a guard-band or in-band of a second wireless communication system are the one or more frequency resources in which the first communication system is operable.

3. The method of claim 1, wherein the parameter indicates the one or more frequency resources in which the first communication system is operable relative to one or more frequency resources of a second wireless communication system.

4. The method of claim 1, wherein the parameter indicates that one or more frequency resources outside both a guard-band and in-band of a second wireless communication system are the one or more frequency resources in which the first communication system is operable.

5. The method of claim 1, wherein the first wireless communication system is operable in a guard-band or in-band of a second wireless communication system.

6. The method of claim 1, further comprising configuring the wireless device to operate on a frequency resource whose location is indicated by the parameter via common signaling in the first wireless communication system responsive to determining that the parameter is not received via the dedicated control signaling.

7. The method of claim 1, wherein the determining that the parameter is received via the dedicated control signaling in the first wireless communication system comprises determining that the parameter is in the control information.

8. The method of claim 1, wherein receiving the signal comprises receiving the signal on a frequency resource in a guard-band or the in-band of a second communication system, or outside a guard-band and the in-band of the second communication system.

9. The method of claim 1, further comprising determining whether the parameter is received via common signaling in the first wireless communication system.

10. The method of claim 9, wherein the determining whether the parameter is received via the common signaling in the first wireless communication system comprises:
receiving, by the wireless device, a signal on a third frequency resource on which the first wireless communication system operates, wherein the signal includes the common signaling having system information;
obtaining the common signaling from the signal;
decoding the common signaling to obtain the system information; and
determining whether the parameter is in the system information.

11. The method of claim 1, wherein the dedicated control signaling is received on a physical downlink control channel (PDCCH) and the common signaling is received on a physical broadcast channel (PBCH).

12. A wireless device for determining a frequency resource on which to operate in a first wireless communication system, the wireless device comprising:
processing circuitry;
memory containing instructions executable by the processing circuitry whereby the wireless device is operative to:
determine whether a parameter is received via dedicated control signaling in the first wireless communication system, wherein a value of the parameter indicates one or more frequency resources in which the first wireless communication system operates, wherein the determining whether the parameter is received via the dedicated control signaling in the first wireless communication system comprises:
receiving, by the wireless device, a signal on a first frequency resource on which the first wireless communication system operates, wherein the signal includes the dedicated control signaling having control information;
obtaining the dedicated control signaling from the signal;
decoding the dedicated control signaling to obtain the control information; and
determining whether the parameter is in the control information; and
responsive to determining that the parameter is received via the dedicated control signaling in the first wireless communication system, configure the wireless device to operate on a second frequency resource whose location is defined based on the parameter received via the dedicated control signaling.

13. A method, performed by a network node in a first wireless communication system, for determining a frequency resource for a wireless device to operate, the method comprising:
generating dedicated control signaling for the wireless device in the first wireless communication system, wherein the generating the dedicated control signaling comprises:
determining a value for a parameter that indicates one or more frequency resources in which the first wireless communication system operates; and
generating control information for the first wireless communication system, wherein the control information includes the parameter; and
encoding the control information to obtain the dedicated control signaling for the first wireless communication system,
wherein the dedicated control signaling includes the parameter, with the parameter being transmitted to the wireless device via the dedicated control signaling to indicate to the wireless device to configure itself to operate on a first frequency resource whose location is defined based on the parameter; and
transmitting the dedicated control signaling to the wireless device in the first wireless communication system.

14. The method of claim 13, further comprising:
generating common signaling for multiple wireless devices in the first wireless communication system, wherein the common signaling includes the same parameter that indicates to the multiple wireless devices one or more frequency resources in which the first wireless communication system operates, with the common signaling being transmitted to the multiple wireless devices in the first wireless communication system; and
transmitting the common signaling to the multiple wireless devices in the first wireless communication system.

15. The method of claim 14, wherein the generating the common signaling for the multiple wireless devices in the first wireless communication system comprises:
determining a value for the parameter that indicates the one or more frequency resources in which the first wireless communication system operates; and
generating system information for the first wireless communication system, wherein the system information includes the parameter; and
encoding the system information to obtain the common signaling for the first wireless communication system.

16. A network node for determining a frequency resource for a wireless device to operate in a first wireless communication system, the network node comprising:
processing circuitry;
memory containing instructions executable by the processing circuitry whereby the network node is operative to:
generate dedicated control signaling for the wireless device in the first wireless communication system, wherein generating the dedicated control signaling comprises:
determining a value for a parameter that indicates the one or more frequency resources in which the first wireless communication system operates; and
generating control information for the first wireless communication system, wherein the control information includes the parameter; and
encoding the control information to obtain the dedicated control signaling for the first wireless communication system,
wherein the dedicated control signaling includes the parameter, with the parameter being transmitted to the wireless device via the dedicated control signaling to indicate to the wireless device to configure itself to operate on a first frequency resource whose location is defined based on the parameter; and
transmit the dedicated control signaling to the wireless device in the first wireless communication system.

* * * * *